(12) United States Patent
Miller

(10) Patent No.: US 10,040,578 B2
(45) Date of Patent: Aug. 7, 2018

(54) BATTERY ARM SENSOR ASSEMBLY

(71) Applicant: Skycatch, Inc., San Francisco, CA (US)

(72) Inventor: Samuel Giles Miller, Folsom, CA (US)

(73) Assignee: SKYCATCH, INC., San Francisco, CA (US)

(*) Notice: Subject to any disclaimer, the term of this patent is extended or adjusted under 35 U.S.C. 154(b) by 231 days.

(21) Appl. No.: 15/054,368

(22) Filed: Feb. 26, 2016

(65) Prior Publication Data

US 2017/0247120 A1    Aug. 31, 2017

(51) Int. Cl.
*B64C 39/02* (2006.01)
*B64F 1/36* (2017.01)
*B64F 1/00* (2006.01)

(52) U.S. Cl.
CPC .............. *B64F 1/36* (2013.01); *B64C 39/024* (2013.01); *B64C 2201/024* (2013.01); *B64C 2201/027* (2013.01); *B64C 2201/042* (2013.01); *B64C 2201/108* (2013.01); *B64C 2201/127* (2013.01); *B64C 2201/165* (2013.01); *B64F 1/007* (2013.01)

(58) Field of Classification Search
CPC .......... B64C 39/024; B64F 1/007; B64F 1/32; B64F 1/36
See application file for complete search history.

(56) References Cited

U.S. PATENT DOCUMENTS

| | | | | |
|---|---|---|---|---|
| 6,960,750 B2* | 11/2005 | Doane | ............. | G02B 5/124 244/135 A |
| 8,167,234 B1* | 5/2012 | Moore | ............. | B64C 37/00 244/17.23 |
| 8,511,606 B1* | 8/2013 | Lutke | ............. | B64C 39/028 244/100 R |
| 9,020,636 B2* | 4/2015 | Tadayon | ............. | B25J 5/02 700/247 |
| 9,139,310 B1* | 9/2015 | Wang | ............. | B64F 1/36 |
| 9,284,062 B2* | 3/2016 | Wang | ............. | B60L 11/1809 |
| 2009/0058355 A1* | 3/2009 | Meyer | ............. | B60L 11/1822 320/104 |
| 2014/0032034 A1* | 1/2014 | Raptopoulos | ............. | G08G 5/0069 701/25 |
| 2016/0039300 A1* | 2/2016 | Wang | ............. | B60L 11/1822 244/39 |
| 2017/0136892 A1* | 5/2017 | Ricci | ............. | B60L 11/182 |

* cited by examiner

*Primary Examiner* — Justin M Benedik
(74) *Attorney, Agent, or Firm* — Keller Jolley Preece

(57) ABSTRACT

The present disclosure is directed toward a system for autonomously landing an unmanned aerial vehicle (UAV) within an unmanned aerial vehicle ground station (UAVGS) and removing a battery assembly from within the UAV while landed. In particular, systems described herein enable a battery arm to engage a battery assembly and remove the battery assembly from within the UAV. Additionally, the battery arm can include one or more sensors that detect a pattern of sensor contacts arranged on an end of the battery assembly. In particular, the sensors on the battery arm can detect and identify the battery assembly based on the particular pattern of sensor contacts on the end of the battery assembly.

20 Claims, 15 Drawing Sheets

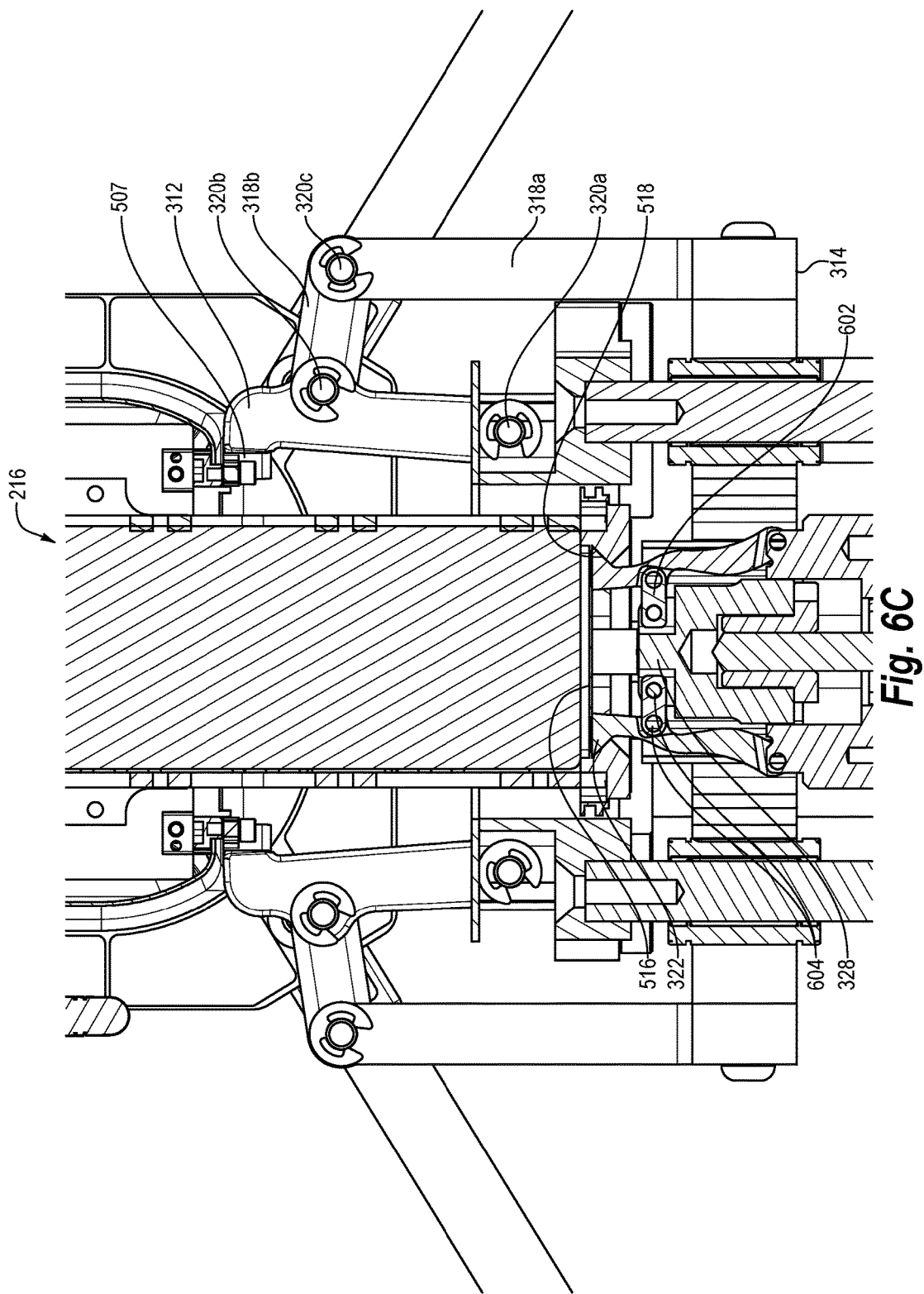

BATTERY ARM SENSOR ASSEMBLY

BACKGROUND

1. Technical Field

One or more embodiments of the present disclosure generally relate to removing a battery from within an unmanned aerial vehicle (UAV). More specifically, one or more embodiments relate to removing a battery from within a UAV and/or an unmanned aerial vehicle ground station (UAVGS) using a battery arm.

2. Background and Relevant Art

Aerial photography and videography are becoming increasingly common in providing images and videos in various industries. For example, aerial photography and videography provides tools for construction, farming, real estate, search and rescue, and surveillance. In recent years, UAVs have provided an improved economical approach to aerial photography and videography compared to capturing photos and videos from manned aircraft or satellites.

Conventional UAVs typically include batteries that power various systems within the UAV. For example, UAVs often include one or more batteries that provide power to rotors, cameras, or other systems on board the UAV. Nevertheless, while batteries provide a light and convenient power source for UAVs, batteries are often limited in the amount and duration of power that they provide to the UAV thus limiting the distance and duration that a UAV can fly and perform various tasks.

In some circumstances, UAVs extend range of flight by landing and taking off from remote ground stations (e.g., UAVGSs). Implementing remote ground stations, however, causes various complications in recharging and/or replacing batteries from within the landed UAVs. For example, a UAV or UAVGS operator typically travels to the remote ground station and manually removes and replaces a battery when the battery ceases to work or when the battery otherwise needs replaced. Performing remote maintenance on the UAV and/or UAVGS, however, results in considerable expense. In particular, the time and expense required to train an operator and to travel to the remote ground station is cost prohibitive to many companies that benefit from the use of UAVs.

Additionally, UAVs and/or UAVGSs often secure batteries within a UAV or UAVGS by locking, impeding access, or otherwise securing the batteries within an opening of the UAV or UAVGS. For example, a battery is often locked within a main body of a UAV to prevent the UAV from accidentally slipping out of the UAV. While locking the battery within an opening prevents the battery from slipping out, securing the battery using a lock increases the complexity of removing the battery from within the UAV and/or UAVGS. Additionally, frequently engaging a locking mechanism often causes wear and tear on a battery. As such, UAVs and UAVGSs that include locking mechanisms often result in increased operator maintenance and additional wear and tear on the battery, UAV, and/or UACGS.

Moreover, UAVGSs and UAVs often experience interference due to dirt, animals, or other foreign objects coming into contact with a UAVGS and obstructing various components when removing and/or replacing a battery within a landed UAV. For example, a buildup of dirt and debris can cause an operator or mechanical replacement apparatus from successfully removing and replacing a battery from within a UAV. As a result, UAVs and UAVGSs often experience difficulty in successfully landing and/or replacing a battery within the UAV due to foreign objects coming into contact with the UAVGS.

Accordingly, there are a number of considerations to be made in removing and/or replacing a battery between a UAV and UAVGS.

BRIEF SUMMARY

The principles described herein provide benefits and/or solve one or more of the foregoing or other problems in the art with systems that enable autonomous removal of a battery from within an unmanned aerial vehicle (UAV). In particular, one or more embodiments described herein include an autonomous landing system that enables a battery arm within an unmanned aerial vehicle ground station (UAVGS) to engage with and conveniently remove a battery assembly from within the UAV or UAVGS. For example, one or more embodiments of the system include a UAVGS having a battery arm that engages a battery assembly and removes the battery assembly from within the UAV. In particular, one or more embodiments of the battery arm includes a battery gripping assembly that extends into an unmanned aerial vehicle ground station (UAVGS) to approach a first end of a battery assembly inserted within the UAV. Additionally, the battery arm can include one or more sensors positioned on the battery arm that detects a position of a plurality of sensor contacts on an end of the battery assembly.

In one or more embodiments, systems and methods include features that facilitate swapping out a battery assembly from within a UAV. For example, the UAVGS can include a battery arm that extends into a landing housing of the UAVGS to engage the UAV and/or battery assembly. In particular, the battery arm can include a battery gripping assembly grips a portion of the battery assembly and allows removal of the battery assembly from within the UAV. Additionally, in one or more embodiments, the battery arm can grip a new battery assembly and replace the removed battery assembly with a new (e.g., charged battery assembly). As such, the UAVGS can autonomously swap out a battery assembly from the UAV and enable multiple flights without frequent operator maintenance.

Furthermore, in one or more embodiments, the system includes features and functionality that enable a battery arm to swap out a battery assembly while limiting wear and tear to the UAV, UAVGS, and/or battery assembly. For example, one or more embodiments of the battery arm include one or more sensors positioned on a portion of the battery arm. The sensors can detect a position of the battery arm with respect to the battery assembly. Detecting a position of the battery arm with respect to the battery assembly enables the battery arm to reliably align with respect to the battery assembly. As a result, the battery arm can unlock the battery assembly from within the UAV and further grip a portion of the battery assembly without causing damage to the UAV, UAVGS, or battery assembly due to misalignment or other inaccuracies in the positions of the battery arm and battery assembly.

Moreover, in one or more embodiments, the system includes features and functionality that enable the battery arm to avoid inadvertent contact with foreign objects or portions of the UAV and/or UAVGS that could cause damage to the system. For example, one or more embodiments of the battery assembly include a plurality of sensor contacts that are arranged in a pattern on a first end of the battery assembly. As mentioned above, the battery arm includes one or more sensors positioned on the battery arm that detect a position of the plurality of sensor contacts. In particular, the sensors on the battery arm can detect a position of the battery arm with respect to the battery assembly as the battery arm approaches the battery assembly. By sensing and detecting the pattern of sensor contacts, the system can avoid causing the battery arm to inadvertently collide with and potentially damage various components of the system.

Additional features and advantages of exemplary embodiments will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the embodiments can be obtained, a more particular description of the principles briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, principles will be described and explained with additional specificity and detail through the use of the accompanying drawings.

FIG. 6C illustrates a top cross-sectional view of an example battery arm removing a battery assembly from within an unmanned aerial vehicle in accordance with one or more embodiments;

DETAILED DESCRIPTION

Figure 1:
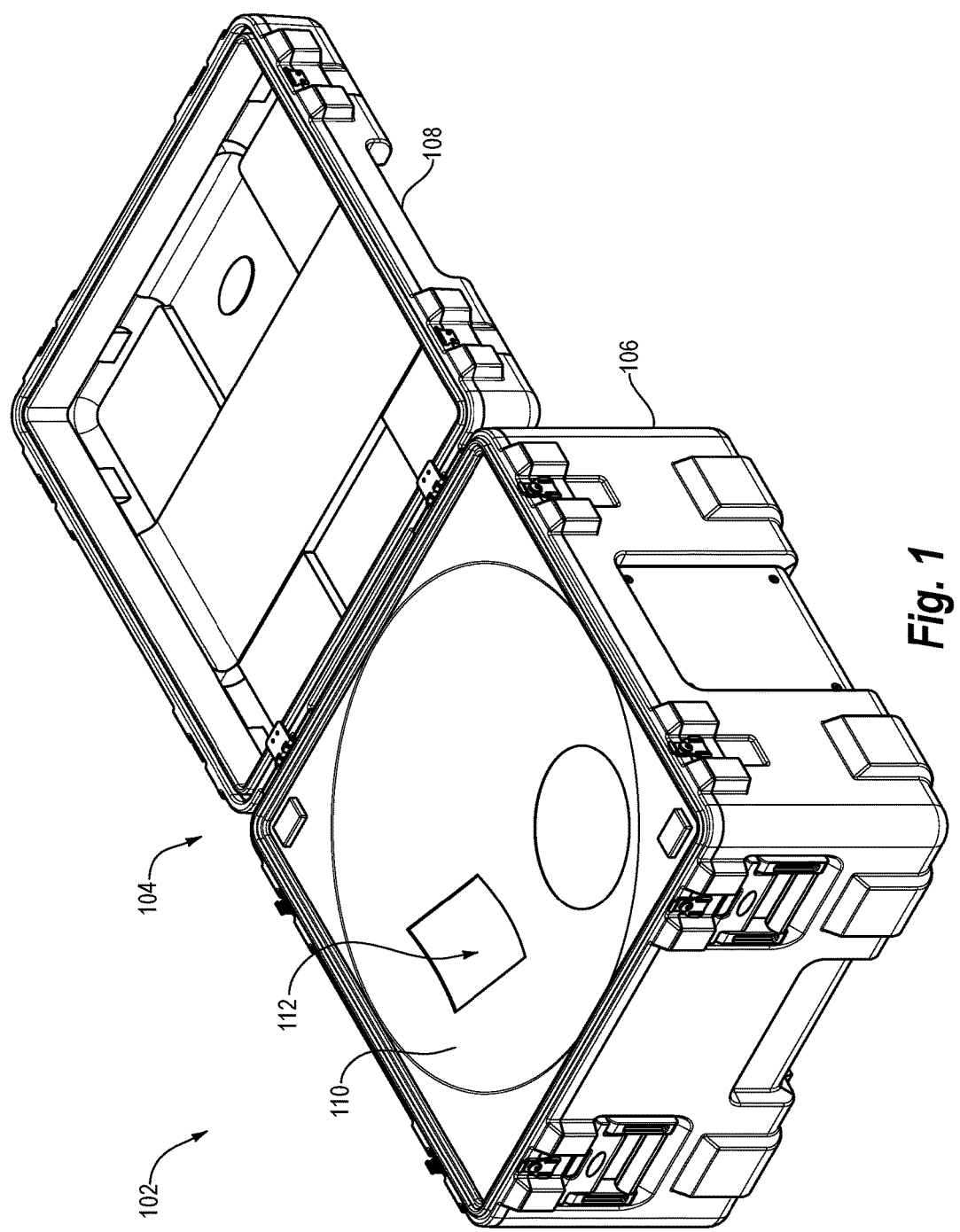
FIG. 1 illustrates a side-perspective view of an example unmanned aerial vehicle ground station in accordance with one or more embodiments.

One or more embodiments described herein include an autonomous landing system that includes a battery arm for engaging and removing a battery assembly from within an unmanned aerial vehicle (UAV). For example, a system can include a UAV that includes a main body and a replaceable battery assembly within the main body of the UAV. Additionally, the system can include an unmanned aerial vehicle ground station (UAVGS) that includes a landing housing that receives the UAV when the UAV lands within the UAVGS. Additionally, the UAVGS can include a battery arm that selectively extends into the landing housing of the UAVGS to grip and remove a battery assembly from within the UAV. Additionally, in one or more embodiments, the battery assembly includes a plurality of sensor contacts arranged in a pattern on an end of the battery assembly. Further, the battery arm can include one or more sensors positioned on the battery arm that detect a position of the plurality of sensor contacts on the battery assembly. For example, the sensors can detect the sensor contacts as a portion of the battery arm moves towards the end of the battery assembly.

The plurality of sensor contacts on the battery assembly detect a relative position between the battery arm and the battery assembly. For example, in one or more embodiments, the battery arm includes one or more sensors on an end of the battery arm that faces the UAV. When the battery arm extends towards the UAV, the sensors can detect a proximity of the battery arm with respect to the battery assembly and prevent the battery arm from inadvertently coming into contact with and potentially damaging the UAV, UAVGS, battery assembly, or other component within the autonomous landing system.

Moreover, the system can utilize the sensors on the battery arm to detect a particular pattern of sensor contacts to prevent accidents involving foreign objects that comes into contact with the system. For example, the sensors on the battery arm can detect a particular pattern of sensor contacts that correspond with a known arrangement of sensor contacts on an outer surface of a battery assembly. The system can determine if the detected pattern of sensor contacts corresponds to an expected pattern of sensor contacts on an end of battery assemblies generally or, alternatively, to a particular battery assembly corresponding to a specific user or UAV. By detecting the patterns of sensor contacts, the system can identify a battery assembly and prevent the battery arm from engaging with debris or other foreign objects within the UAVGS.

In one or more embodiments, the UAVGS and associated battery arm reduces frequency of operator maintenance by enabling autonomous replacement of a battery assembly within a UAV. For example, when the UAV lands within the UAVGS, the battery arm selectively engages the UAV to unlock and remove the battery assembly from within the UAV. As such, the battery arm can autonomously engage the UAV and battery assembly to conveniently replace the battery assembly from within the UAV without requiring operator maintenance.

In addition to enabling convenient replacement of the battery assembly, one or more embodiments of the battery arm help reduce wear and tear on the battery assembly by engaging the UAV and battery assembly using multiple engagement assemblies on the battery arm. For example, the battery arm can include a latch engagement assembly and a battery gripping assembly. The latch engagement assembly engages one or more latches on the UAV to unlock the battery assembly from within the UAV. Once unlocked, a battery gripping assembly grips a portion of the battery assembly and allows the battery arm to remove the battery assembly from the UAV when the battery arm retracts away from the UAV. The latch assembly and gripping assembly enable the UAVGS to automatically remove the battery assembly from within the UAV.

The term "unmanned aerial vehicle" ("UAV"), as used herein, generally refers to an aircraft that can be piloted autonomously or remotely by a control system. For example, a "drone" is a UAV that can be used for multiple purposes or applications (e.g., military, agriculture, surveillance, etc.). In one or more embodiments, the UAV includes onboard computers that control the autonomous flight of the UAV. In at least one embodiment, the UAV is a multi-rotor vehicle, such as a quadcopter, and includes a carbon fiber shell, integrated electronics, a battery bay (including a battery assembly), a global positioning system ("GPS") receiver, a fixed or swappable imaging capability (e.g., a digital camera), and various sensors or receivers. The UAV can also include a computing device including programmed instructions that allow the UAV to takeoff, fly, and land autonomously.

The term "unmanned aerial vehicle ground station" ("UAVGS"), as used herein, generally refers to an apparatus from which a UAV can takeoff, and where the UAV can later land and be stored until its next flight. For example, the UAVGS can include a carbon fiber box containing a UAV storage area that functions as a takeoff area and/or a landing pad when the UAV is not being stored. In at least one embodiment, following the autonomous landing of the UAV, one or more systems of the UAVGS can recharge or swap-out one or more batteries of the UAV, download data (e.g., digital photographs, digital videos, sensor readings, etc.) collected by the UAV. In one or more embodiments, the UAVGS allows for wireless communication between the UAVGS and a server to transfer of data collected by the UAV and downloaded to the UAVGS to the server.

The term "battery arm," as used herein, generally refers to a mechanical apparatus that engages a battery assembly and causes the battery assembly to remove from within a receiving slot of a UAV or battery docking station. For example, the battery arm can include a mechanical arm that extends and retracts. Additionally, the battery arm can include multiple actuators (e.g., motors), plates, rods, screws, pins, links, chains, sensors, pivot points, circuitry, and various assemblies that engage with the UAV and/or battery assembly to facilitate automatic removal and automatic replacement of a battery assembly.

Figure 2:
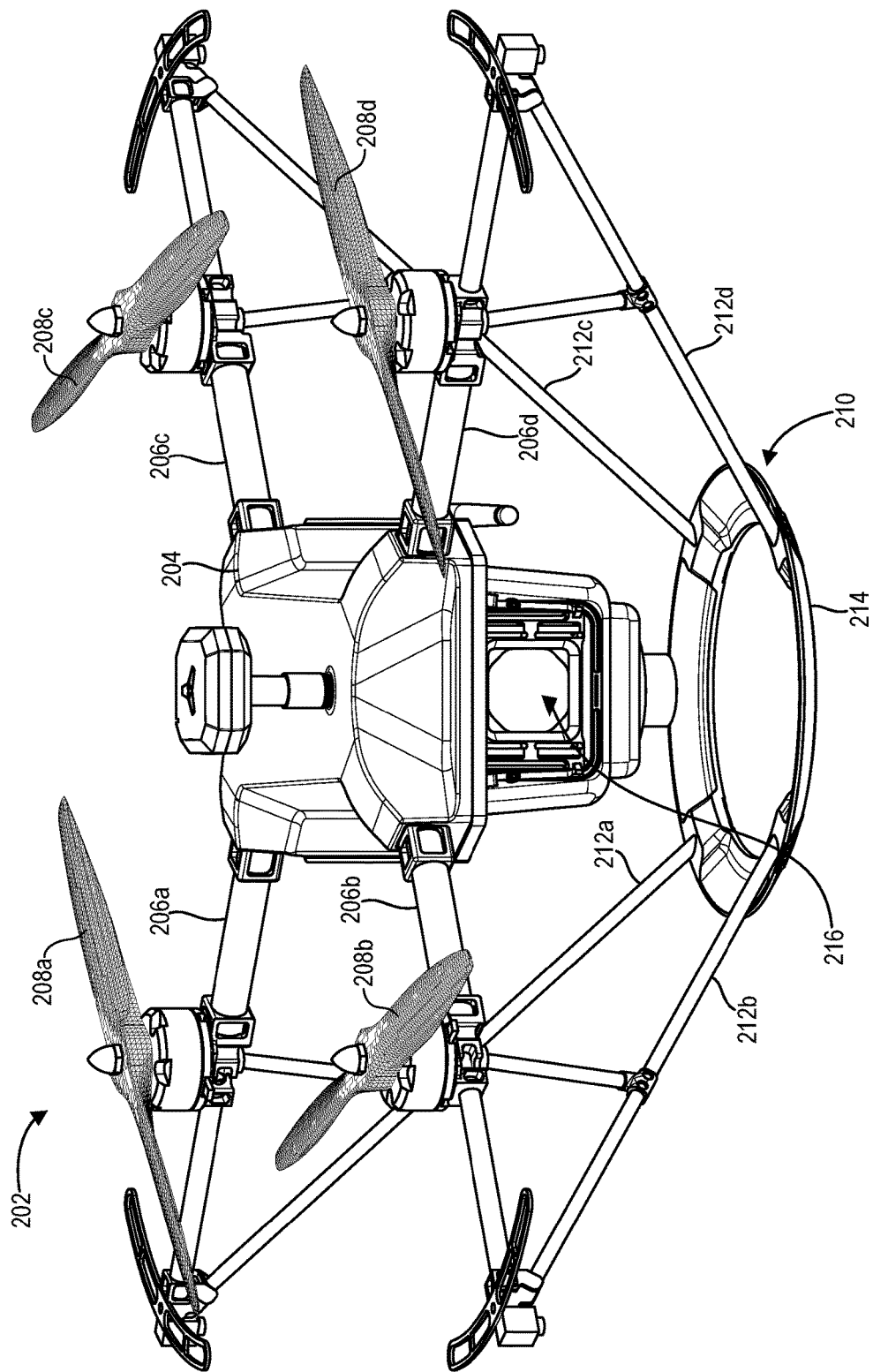
FIG. 2 illustrates a side-perspective view of an example unmanned aerial vehicle in accordance with one or more embodiments.

To aid in description of the battery arm and methods of using automatic battery assembly removal and replacement, an overview of an example unmanned aerial vehicle and ground station are first described with reference to FIGS. 1 and 2. One will appreciate that the configuration of the UAV and ground station are exemplary embodiments and the later described battery arm can function with a wide variety of UAVs, ground stations, and battery assemblies. FIGS. 1 and 2 illustrate perspective views of an unmanned aerial vehicle ground station 102 (or simply "UAVGS 102") and an unmanned aerial vehicle 202 (or simply "UAV 202") that lands within the UAVGS 102. For example, as shown in FIG. 1, the UAVGS 102 includes a housing 104 including a base 106 and a hinged lid 108. In one or more alternative embodiments, the UAVGS 102 can have a different shape or configuration. For example, the UAVGS 102 may lack a lid and include additional or alternative features.

Additionally, as illustrated in FIG. 1, the UAVGS 102 includes a landing housing 110. As shown in FIG. 1, the landing housing 110 includes an opening toward a top surface of the base 106 and a floor of the landing housing 110 that makes up a bottom surface of the landing housing 110. Further, as shown in FIG. 1, the landing housing 110 has a shape that extends downward and inward from the opening of the landing housing 110 at the top of the base 106 toward a circular floor of the landing housing 110. In one or more embodiments, the UAVGS 102 includes a single landing housing 110 shaped to receive a single UAV 202 within the UAVGS 102. Alternatively, the UAVGS 102 can include multiple landing housings 110 having similar or different shapes and sizes.

While FIG. 1 illustrates one example in which the landing housing 110 has a conical shape, it is appreciated that the landing housing 110 can have a variety of different shapes and sizes. In any event, in one or more embodiments, the landing housing 110 has a complimentary shape to a landing base of a UAV. As such, the UAV fits within the complimentary-shaped landing housing 110 when the UAV lands within the UAVGS 102. In one or more embodiments, the landing housing 110 includes a shape that enables the UAV to fit within the landing housing 110 and align within the landing housing 110. Additionally, in one or more embodiments, the landing housing 110 includes a shape (e.g., symmetrical shape) that slants downward and inward from the opening at the top of the base 106 toward the floor of the landing housing 110 to enable the UAV to self-align within the landing housing 110 as the UAV comes into contact with and lands within the UAVGS 102.

Additionally, as shown in FIG. 1, the UAVGS 102 further includes an opening 112 in a wall of the landing housing 110. In particular, the landing housing 110 can include one or more openings 112 through which a portion of a battery arm passes and engages the UAV and/or battery assembly on board the UAV. For example, as will be explained in greater detail below, the battery arm extends through the opening 112 and unlocks a battery assembly within the UAV. Once unlocked, the battery arm grips the battery assembly and removes the battery assembly from within the UAV. Additionally, in one or more embodiments, the battery arm replaces the removed battery assembly with a new (e.g., charged) battery assembly retrieved from within the UAVGS 102.

In one or more embodiments, rather than having an opening 112 in a wall of the landing housing 110, one or more embodiments of the landing housing 110 include a landing frame or landing housing without a wall that provides unobstructed access between the battery arm and a UAV landed within the UAVGS 102. For example, the landing housing 110 can include a frame structure that includes multiple portions through which the battery arm can extend to engage the UAV and remove a battery assembly from within the UAV.

In one or more embodiments, the UAVGS 102 includes a carousel feature that enables the landing housing 110 and/or UAV to rotate within the UAVGS 102 to align the UAV with respect to one or more battery arms within the UAVGS 102. For example, in one or more embodiments, the landing housing 110 rotates and aligns the opening 112 and/or battery arm with a portion of the UAV that houses the battery assembly such that the battery arm can engage the UAV and remove the battery assembly. As another example, in one or more embodiments, the UAVGS 102 causes the UAV to rotate (e.g., using the floor of the landing housing 110) and align the UAV with the opening 112 in the landing housing 110. Additionally, or alternatively, in one or more embodiments, the UAVGS 102 causes the battery arm to rotate within the UAVGS 102 to align with the opening 112 and the UAV 202.

Furthermore, the UAVGS 102 can include one or more engagement points that secure a UAV in place within the landing housing 110 of the UAVGS 102. In particular, the UAVGS 102 can include one or more components that hold, fasten, or otherwise secure the UAV within the landing housing 110. As an example, the UAVGS 102 can include one or more magnets, grooves, rails, or various mechanical components that secure the UAV in place within the UAVGS 102. Alternatively, in one or more embodiments, the UAV can include one or more components that secure the UAV within the landing housing 110 of the UAVGS 102. The ability to hold the UAV in place within the UAVGS 102 can aid in battery assembly re-movement and replacement as described below.

FIG. 2 illustrates an example UAV 202 in accordance with one or more embodiments described herein. As shown, the UAV 202 includes a main body 204 coupled to a plurality of rotor arms 206a-d that each support a respective rotor 208a-d. It will be understood that by varying the speed of the rotors 208a-d, the UAV 202 (e.g., a UAV controller on the UAV 202) can control the speed, direction, and altitude of the UAV 202. For example, the UAV 202 can control the speed of the rotors 208a-d in order to move the UAV 202 within a three-dimensional space. In additional or alternative embodiments, the UAV 202 may include fewer or additional rotor arms and rotors, depending on various factors such as the weight of the UAV 202. Additionally, as discussed above, the UAV 202 can include a computing device, such as described below with reference to FIG. 9, to use for controlling the UAV 202 based on input provided from one or more sensors.

As illustrated in FIG. 2, the UAV 202 includes a landing base 210 coupled to the main body 204 of the UAV 202. In particular, in one or more embodiments, the landing base 210 is connected to and positioned below the main body 204 of the UAV 202. As shown in FIG. 2, the landing base 210 includes a landing frame including legs 212a-d. Each of the legs 212a-d can correspond to respective rotor arms 206a-d. It is appreciated that the landing frame can include any number of legs 212. Alternatively, the landing frame includes a single structure or shell that extends around the landing base 210 (e.g., around a central axis of the UAV 202) and couples a landing pad 214 to the rotors 208 and main housing 204. In one or more embodiments, a shape formed by the legs 212a-d of the landing frame corresponds to the landing housing 110 of the UAVGS 102. For example, the landing frame can form a complimentary conical shape to the conically-shaped landing housing 110 shown in FIG. 1.

Additionally, as shown in FIG. 2, the landing base 210 includes a landing pad 214 positioned below the main body 204 of the UAV 202. In one or more embodiments, the landing pad 214 includes a circular landing ring. For example, the landing pad 214 can include a circular landing ring that corresponds to a shape of the floor of the landing housing 110. Alternatively, the landing pad 214 can include different shapes other than those shown in FIG. 2. For example, the landing pad 214 may have an angular shape, oval shape, or any symmetrical or non-symmetrical shape that fits within the floor of the landing housing.

Additionally, as shown in FIG. 2, the UAV 202 includes a battery assembly 216 within the main body 204 of the UAV 202. For example, as will be described in greater detail below, the battery assembly 216 includes a battery cell within a battery housing that slides in and out of a receiving slot that receives the battery assembly 216 within the main housing 204 of the UAV 202. The battery assembly 216 provides power to any number of systems and components on board the UAV 202. For example, the battery assembly 216 provides power to the rotors 208a-d, a camera attached to the main body 204, and one or more electrical systems on board the UAV 202.

Additionally, as will be explained in greater detail below, the UAV 202 includes one or more latches that secure the battery assembly 216 within the receiving slot of the UAV 202. For example, when the battery assembly 216 is completely inserted within the receiving slot, one or more latches prevent the battery assembly 216 from sliding or falling out of the main housing 204. When removing the battery assembly 216, a battery arm of the UAVGS 102 engages the latches and unlocks the battery assembly. Once the battery assembly 216 is unlocked, the battery arm grips the battery assembly 216 and remove the battery assembly 216 from the receiving slot of the UAV 202.

Figure 3:
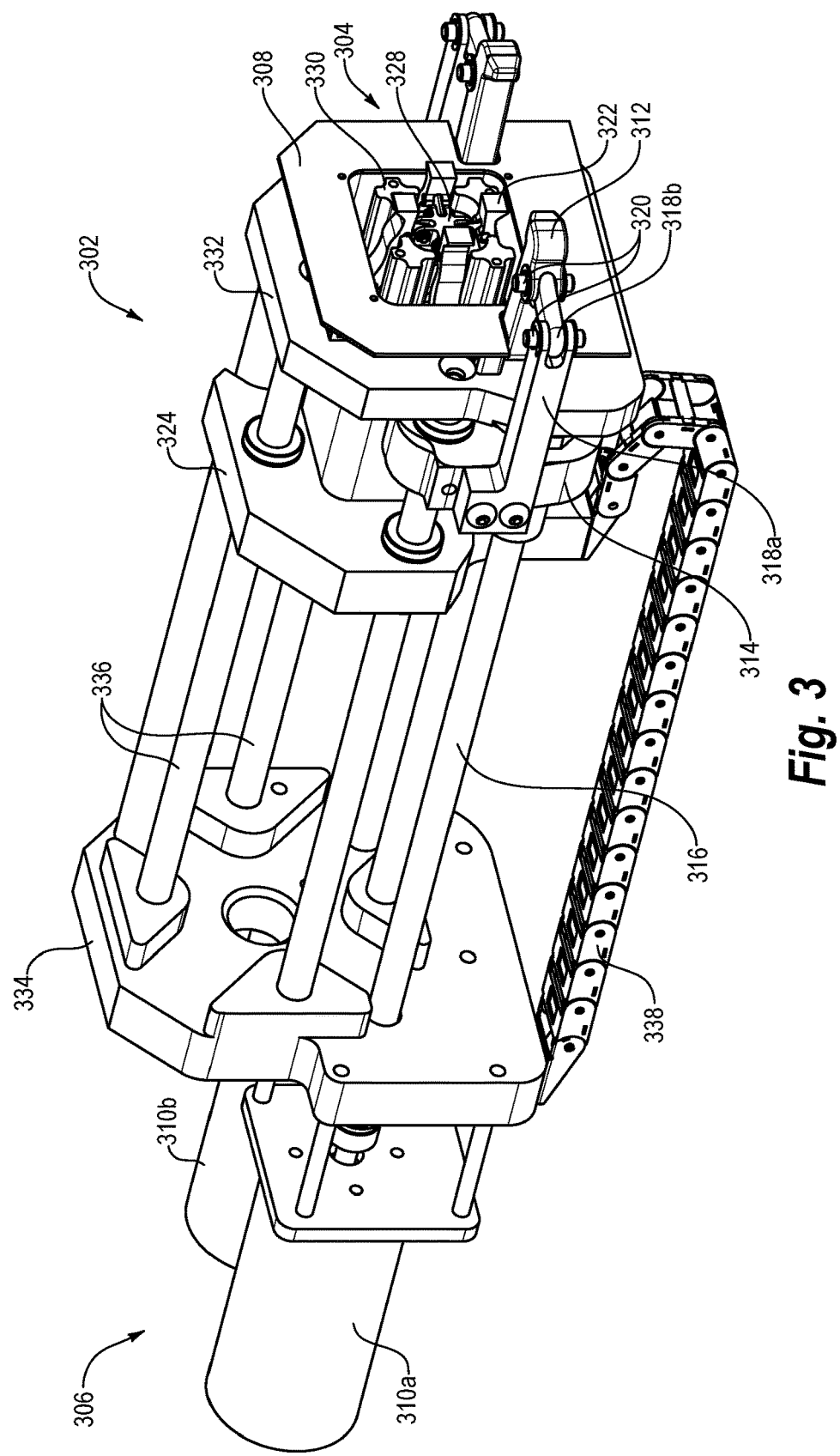
FIG. 3 illustrates a perspective view of a battery arm in accordance with one or more embodiments.
Figure 4:
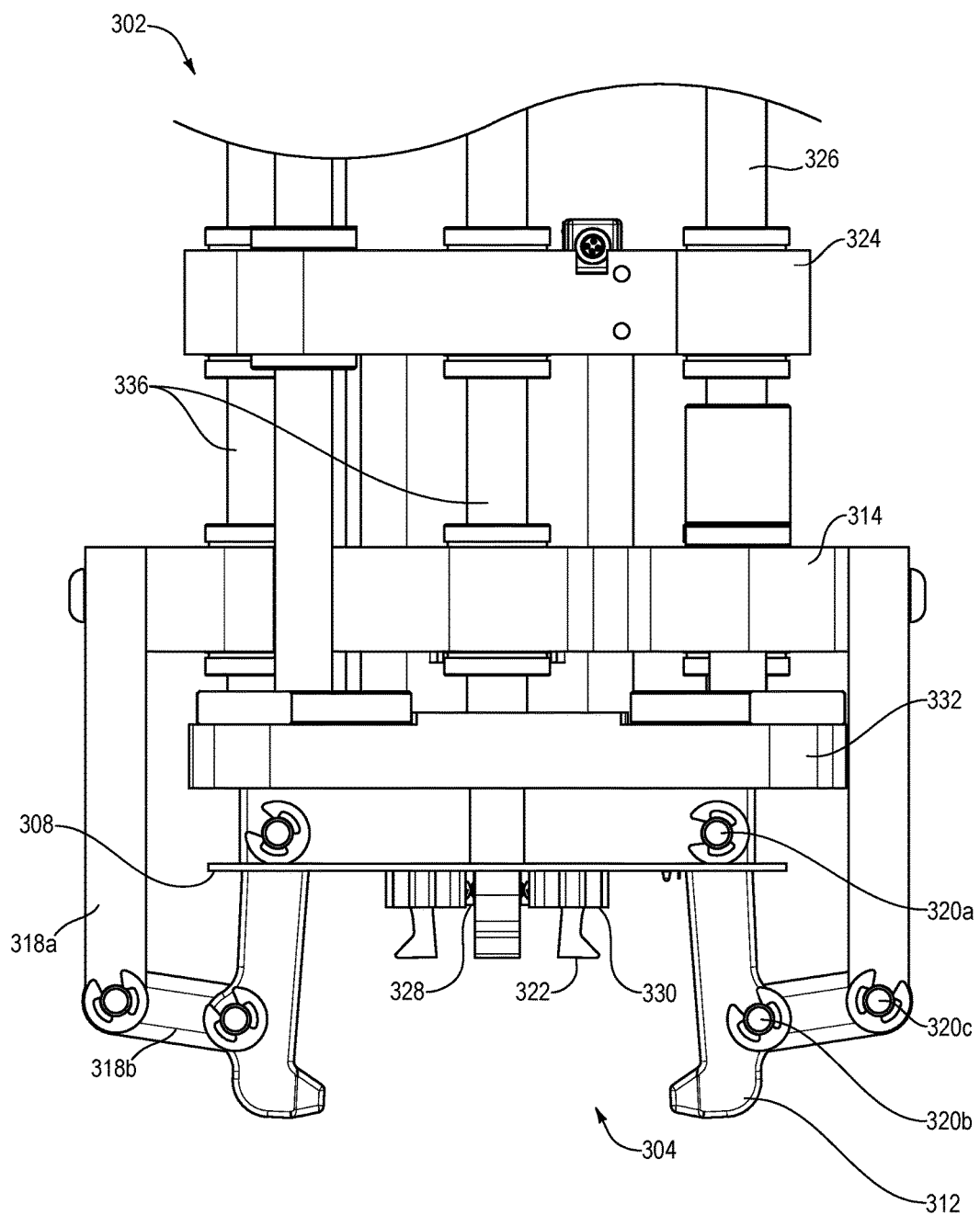
FIG. 4 illustrates a top view of a portion of a battery arm in accordance with one or more embodiments.

FIGS. 3 and 4 illustrate different views of an example battery arm 302 in accordance with one or more embodiments described herein. As mentioned above, the battery arm 302 can remove and replace a battery assembly 216 from within the main housing 204 of the UAV 202 when the UAV 202 is landed within a UAVGS 102. Prior to removing the battery assembly 216, the battery arm 302 aligns with the battery assembly 216 such that a first end 304 of the battery arm 302 is facing the UAV 202 and a second end 306 of the battery arm 302 is facing outward from the UAV 202 (e.g., toward the housing 104 of the UAVGS 102).

In addition to aligning the battery arm 302 with respect to the UAV 202 and/or battery assembly 216, a portion of the battery arm 302 moves or extends toward the UAV 202. For example, the first end 304 of the battery arm 302 moves toward the UAV 202. In one or more embodiments, the battery arm 302 moves toward the UAV 202 until an end plate 308 or other portion of the first end 304 of the battery arm 302 is within a predefined proximity of the UAV 202 or an end of the battery assembly 216. For example, the UAVGS 102 causes the battery arm 302 to move towards the UAV 202 until the first end 304 of the battery arm 302 is close enough to the UAV 202 that one or more components of the battery arm 302 are able to engage the UAV 202 and/or battery assembly 216.

In one or more embodiments, the battery arm 302 engages one or more latches on a UAV 202 to unlock a battery assembly 216 from within the main housing 204 of the UAV 202. In particular, the battery arm 302 includes a latch engagement assembly that includes one or more actuators that cause one or more latch engagers to come into contact with and engage one or more latches on the UAV 202. For example, as shown in FIG. 3, the latch engagement assembly includes a motor 310a, outer fingers 312, a latch engagement plate 314 (or simply "plate 314"), a driving rod 316, links 318a-b, and one or more pivot points 320 around which portions of the outer fingers 312 rotate. Additionally, FIG. 4 illustrates a view of the first end 304 of the battery arm 302 showing the plate 314, driving rod 316, links 318a-b, pivot points 320, and outer fingers 312.

As mentioned above, the latch engagement assembly can include an actuator, such as a motor 310a. As shown in FIG. 3, the motor 310a is positioned towards the second end 306 of the battery arm 302 and coupled to the outer fingers 312 via a driving rod 316, plate 314, and links 318a-b. While FIG. 3 illustrates one example embodiment of the battery arm 302 that includes a motor 310a, it is appreciated that the battery arm 302 can include various types of actuators such as, for example, hydraulic, pneumatic, electric, magnetic, or mechanical actuators and/or various types of motors capable of causing the outer fingers 312 to move and engage one or more latches on the UAV 202. Additionally, while FIG. 3 illustrates the motor 310a toward the second end 306 of the battery arm 302, it is appreciated that the motor 310a may be located anywhere between the first end 304 and second end 306 of the battery arm 302.

Further, as mentioned above, in causing a battery assembly 216 to unlock from within the UAV 202, the motor 310a causes the outer fingers 312 to rotate and engage with one or more latches on the UAV 202. In particular, the motor 310a can cause the outer fingers 312 to rotate toward the latches on the UAV 202 by driving the plate 314 toward the first end 304 of the battery arm 302 and causing the link 318 between the plate 314 and the outer fingers 312 to move towards the UAV 202. By causing the plate 314 and link 318 to move toward the UAV 202, the outer fingers 312 move about one or more pivot points 320 and rotate inward such that an edge of each of the outer fingers 312 engages with a respective latch on the UAV 202.

In driving the plate 314 towards the first end 304 of the battery arm 302, the motor 310a can cause the driving rod 316 to move and drive the plate 314 towards the UAV 202. In particular, as illustrated in FIG. 3, the driving rod 316 includes a threaded rod that spins and drives the plate 314 by causing the plate 314 to move towards the first end 304 of the battery arm 302 as the threaded driving rod 316 spins. Alternatively, rather than causing a threaded driving rod 316 to spin and drive the plate 314 towards the UAV 202, one or more embodiments of the latch engagement assembly can include a driving rod 316 that extends or otherwise moves to cause the plate 314 to move towards the first end 304 of the battery arm 302 and cause the outer fingers 312 to engage with latches on the UAV 202.

In addition to generally moving the plate 314 and outer fingers 312 towards the UAV 202, driving the plate 314 towards the UAV 202 further causes the outer fingers 312 to rotate about one or more pivot points 320. In particular, as shown in FIGS. 3 and 4, the latch engagement assembly includes a link 318a, 318b between the plate 314 and the outer fingers 312 that couples to the outer fingers 312 via one or more pivot points 320. As will be explained in greater detail below, when the motor 310a drives the plate 314 toward the UAV 202, one or more of the links 318a, 318b also move toward the UAV 202 and cause the outer ends of the outer fingers 312 to move towards the UAV 202 while rotating inward about one or more of the pivot points 320. In particular, when the link 318b moves toward the UAV 202, the movement of the link 318 causes the outer fingers 312 to rotate about one or more pivot points 320 and pivot inward about the first end 304 of the battery arm 302 and engage with latches on the UAV 202. In one or more embodiments, when the outer fingers 312 engage with the latches on the UAV 202, the battery assembly 216 unlocks from within the UAV 202.

In one or more embodiments, the battery gripping assembly utilizes over center linkage features when causing the outer fingers 312 to rotate inward about the one or more pivot points 320a-c. In particular, as shown in FIG. 4, the links 318a, 318b, and the outer finger 312 form an over center linkage. As explained below, the over center linkage can allow for fine tuning of the position of the finger 312 relative to a battery assembly. Additionally, the over center linkage can ensure that the finger 312 does not extend too far toward the battery assembly. Further, in one or more embodiments, the over center linkage enables the fingers 312 to apply additional force at the end of a stroke, thus locking in holding force requiring additional motor torque. In one or more embodiments, the battery gripping assembly measures a force of engagement between the battery arm 302 and the battery assembly 216 based on a deflection or displacement of the links 318a-b when engaging the battery assembly 216. This allows the battery gripping assembly to prevent applying more than a predetermined threshold of force.

Thus, when the motor 310b causes the plate 314 to move towards the first end 304 of the battery arm 302 and cause the outer fingers 312 to rotate inward relative to the pivot points 320a-c at different rates based on a rotational position of the of the outer fingers 312 with respect to the pivot points 320a-c. For example, the outer fingers 312 can rotate more relative to a corresponding movement of the plate 314 or motor 310b when the outer fingers 312 extend outward from the central axis of the battery arm 302 (e.g., parallel to the outer plate 308) prior to engagement with the UAV 202 or battery assembly 216. Additionally, the outer fingers 312 can rotate less relative to the same movement of the plate 314 or motor 310b when the outer fingers 312 have rotated about the first pivot point 320a and approach an engagement position of the outer fingers 312 (e.g., perpendicular to the outer plate 308).

For example, as shown in FIG. 4, the motor 310b can drive the plate 314 toward the first end 304 of the battery arm 302 which would cause the second pivot point 320b and the third pivot point 320b to initially move toward the first end 304 and cause the outer fingers 312 to rotate about the first pivot point 320a. As the outer fingers 312 continue to rotate about the first pivot point 320a, the second pivot point 320b begins moving inward toward a central axis of the battery arm 302 while the third pivot point 320c continues to move towards the first end 304 of the battery arm 302. As the second pivot point 320b moves towards the central axis of the battery arm, the rate at which the outer fingers rotates about the first pivot point 320a slows relative to movement of the first pivot point 320a towards the first end 304 of the battery arm 302. Thus, as the outer fingers 312 approach an engagement position, the rotation of the outer fingers 312 can slow the rate at which the outer fingers 312 rotate relative to movement of the plate 314 toward the first end 304 of the battery arm 302.

In addition to causing the outer fingers 302 to rotate at different rates relative to movement of the motor 310b or plate 314, the over center linkage can prevent the outer fingers 302 from over-rotating beyond a maximum point of rotation. For example, as the outer fingers 312 rotate about the first pivot point 320a and the second pivot point 320b moves inward toward the central axis of the battery arm 302, the outer fingers 312 reach a maximum rotation about the first pivot point 320a notwithstanding continued movement of the first pivot point 320a toward the first end 304 of the battery arm 302. Thus, the battery arm 302 can drive the plate 314 beyond a point of engagement without causing the outer fingers 312 to continue rotating about the first pivot point 320a and risking damage to the battery assembly 216, UAV 202, or blocking a path for removing or inserting a battery assembly 216 within the UAV 202.

Additionally, or alternatively, in one or more embodiments, the battery arm 302 includes a stop, lock, or other feature that causes the outer fingers to stop rotating inward about the one or more pivot points 320a-c. As an example, the battery arm 302 can include a stop on one or more of the pivot points 320a-c or other portion of the battery arm 302 that prevents the outer fingers 312 from rotating beyond a specific point or angle. Similar to the over center linkage features discussed above, the stop, lock, or other feature the prevents rotation of the outer fingers 312 beyond a maximum rotation can prevent the outer fingers 312 from rotating inward to a point that could potentially damage one or more latches or springs on the UAV 202 or battery assembly 216 or obstruct a path for inserting or removing the battery assembly 216 from within the UAV 202.

Moreover, in one or more embodiments, one or more of the links 318a-b include compression and/or spring properties that cause the outer fingers 312 to apply a constant force to the UAV 202 when engaged with one or more latches on the UAV 202. For example, the first link 318a and/or second link 318b can include a spring that causes the outer fingers 312 to apply a force to one or more latches on the UAV 202 without further force applied via the motors 310b driving the plate 314 toward the UAV 202 beyond initial engagement between the outer fingers 312 and the UAV 202. In one or more embodiments, each of the links 318a-b include a spring or other compliant member that causes the outer fingers 312 to apply force on respective latches of the UAV 202. Alternatively, in one or more embodiments, only the first link 318a of the first and second links 318a-b includes a spring or other compliant member that causes the outer fingers 312 to apply force on respective latches of the UAV 202.

In addition to unlocking the battery assembly 216 from within the UAV 202, the battery arm 302 can further remove the battery assembly 216 from the UAV 202. For example, as shown in FIGS. 3-4, the battery arm 302 includes a battery gripping assembly that engages with the battery assembly 216 and grips a portion of the battery assembly 216 while removing the battery assembly 216 from the UAV 202. In particular, as illustrated in FIG. 3, the battery gripping assembly includes a motor 310b, inner fingers 322, a battery gripping plate 324 (or simply "plate 324"), a driving rod 326, a spreader 328, and optionally sensors 330. Additionally, FIG. 4 illustrates a view of the first end 304 of the battery arm 302 showing the inner fingers 322, plate 324, driving rod 326, spreader 328, and sensors 330.

Similar to the latch engagement assembly, the battery gripping assembly includes an actuator, such as a motor 310b. The motor 310b of the battery gripping assembly includes similar features and functionality as the motor 310a of the latch engagement assembly. In one or more embodiments, the motor 310b causes one or more battery grippers to engage a portion of the battery assembly 216 and grip an end of the battery assembly 216. For example, the motor 310b causes inner fingers 322 to engage a portion of the battery assembly 216 and grip the battery assembly 216. In one or more embodiments, the motor 310b causes the ends of the inner fingers 322 to move toward the outer fingers 312 and grip an end of the battery assembly 216. As will be explained in greater detail, once the inner fingers 322 have gripped a portion of the battery assembly 216, the battery arm 302 retracts and removes the unlocked battery assembly 216 from within the UAV 202.

Further, as mentioned above, in causing the inner fingers 322 to engage with and grip the battery assembly 216, the motor 310b drives the plate 324 towards the UAV 202. In particular, similar to the first motor 310a that causes the driving rod 316 to move and drive the latch engagement plate 314 toward the UAV 202, the second motor 310b causes a driving rod 326 to move (e.g., spin, extend) and drive the plate 324 toward the UAV 202. In one or more embodiments, driving the plate 324 toward the UAV 202 causes the inner fingers 322 to pivot outward toward the outer fingers 312 and grip an end of the battery assembly 216.

In one or more embodiments, driving the plate 324 toward the first end 304 of the battery arm 302 causes a spreader 328 to push toward the first end 304 of the battery arm 302 between one or more of the inner fingers 322. In particular, as shown in FIGS. 3-4, the battery gripping assembly includes a spreader 328 positioned between each of the inner fingers 322 and which causes the inner fingers 322 to push, pivot, flex, or otherwise move outward from around a central axis of the battery arm 302 when the plate 324 moves toward the first end 304 of the battery arm 302. For example, when the motor 310b drives the plate 324 toward the UAV 202, the plate 324 can push the spreader 328 toward the first end 304 of the battery arm 302 between each of the inner fingers 322. In one or more embodiments, the spreader 328 causes the inner fingers 322 to flex or bend outward from the central axis of the battery 302 when the plate 324 moves towards the first end of the battery arm 302. Alternatively, the spreader 328 can cause the inner fingers 322 to rotate, pivot, or otherwise move outward from the central axis of the battery arm 302.

Additionally, as mentioned above, the battery arm 302 can include one or more sensors 330 toward the first end 304 of the battery arm 302 that face the UAV 202 as a portion of the battery arm 302 approaches the battery assembly 216 within the UAV 202. For example, prior to the inner fingers 322 gripping the battery assembly 216, some or all of the battery gripping assembly can move towards the battery assembly 216. In particular, the motor 310b can drive the plate 324 toward the first end 304 of the battery arm 302 and cause the inner fingers 322, spreader 328, and sensors 330 to move towards an outer end of the battery assembly 216 facing outward from the UAV 202. As the battery gripping assembly moves towards the battery assembly 216, the sensors 330 can detect a position of the battery arm 302 with respect to the battery assembly 216.

The sensors 330 can include various types of sensors 330 for determining a position of the battery arm 302 relative to the battery assembly 216. As an example, the sensors 330 can include one or more proximity sensors, optical sensors, metal-detecting sensors, or other types of sensors capable of detecting a distance between the battery assembly 216 and the battery arm 302. In particular, the sensors 330 can detect a distance between the sensors 330 and an outer surface 516 of the battery arm 302. Additionally, in one or more embodiments, the sensors 330 detect a distance between the sensors 330 and one or more contacts on the outer end 516 of the battery assembly 216.

In addition to detecting a position of the battery arm 302 relative to the battery assembly 216 or other objects, the sensors 330 can further identify the battery assembly 216 and distinguish the battery assembly 216 from other objects by detecting a pattern of sensor contacts on an outer end of the battery assembly 216. For example, as will be described in greater detail below, the battery assembly 216 can include a plurality of sensor contacts arranged in a pattern on a surface of the battery assembly 216 facing outward from the UAV 202 when the battery assembly 216 is inserted within the main housing 204 of the UAV 202. As the battery arm 302 moves towards the battery assembly 216, the sensors 330 can detect the pattern of sensor contacts and identify the battery assembly 216 and/or distinguish the battery assembly 216 from other objects based on the detected pattern of sensor contacts on the outer end of the battery assembly 216.

The sensors 330 can enable the battery arm 302 to align with respect to the battery assembly 216 by moving within a distance of the battery assembly 216 to enable the latch engagement assembly and/or battery gripping assembly to engage the UAV 202 and/or battery assembly 216. For example, the sensors 330 can detect that the battery gripping assembly is positioned relative to the battery assembly 216 such that the inner fingers 322 are positioned to grip a portion of the battery assembly 216 when the spreader 328 causes the inner fingers 322 to push, flex, or otherwise move outward from around the central axis of the battery arm 302. Additionally, the sensors 330 can prevent one or more portions of the battery arm 302 to inadvertently come into contact and potentially damage the battery assembly 216 or other portion of the UAV 202 or UAVGS 102.

Moreover, as will be described in greater detail below, the sensors 330 can further prevent the battery arm 302 from inadvertently engaging a number of foreign objects or other components of the autonomous landing system other than a latch of the UAV 202 and/or outer end of the battery assembly 216. For example, as mentioned above, the sensors 330 can detect a pattern of sensor contacts and compare the detected pattern to one or more patterns known to correspond to an arrangement of sensor contacts on an outer end of a battery assembly 217. In this way, where the sensors 330 fail to detect a particular pattern of sensor contacts on a surface of an object, the battery arm 302 can stop extending or otherwise avoid coming into contact with the object and potentially causing damage to the battery arm 302 and/or other components of the autonomous landing system. Conversely, if the sensors 330 succeed in identifying a particular pattern of sensor contacts, the UAVGS 102 can cause a portion of the battery arm 302 (e.g., the battery gripping assembly) to continue moving towards the battery assembly 216 without risk of colliding with a foreign object and potentially causing damage to one or more components of the autonomous landing system.

Moreover, as shown in FIG. 3, the battery arm 302 includes one or more additional plates 332, 334 positioned at either end of the battery arm 302. For example, the battery arm 302 includes a first end plate 332 towards the first end 304 of the battery arm 302 and a second end plate 334 towards the second end 306 of the battery arm 302. In one or more embodiments, the first end plate 332 is coupled to the second end plate 334 via one or more guide rails 336. The plates 332, 334 and guide rails 336 provide a horizontal structure along which the plates 314, 324 and driving rods 316, 326 can move and cause portions of the battery arm 302 to engage the UAV 202 and/or battery assembly 216. Additionally, as shown in FIG. 3, the battery arm 302 includes a chain 338 that couples an end plate 334 to a driving plate 324. In one or more embodiments, the chain 338 prevents the driving plate 324 from moving more than a length of the chain 338 away from the end plate 334 and coming into contact with and potentially causing damage to other portions of the battery arm 302 and/or the UAV 202.

Figure 5:
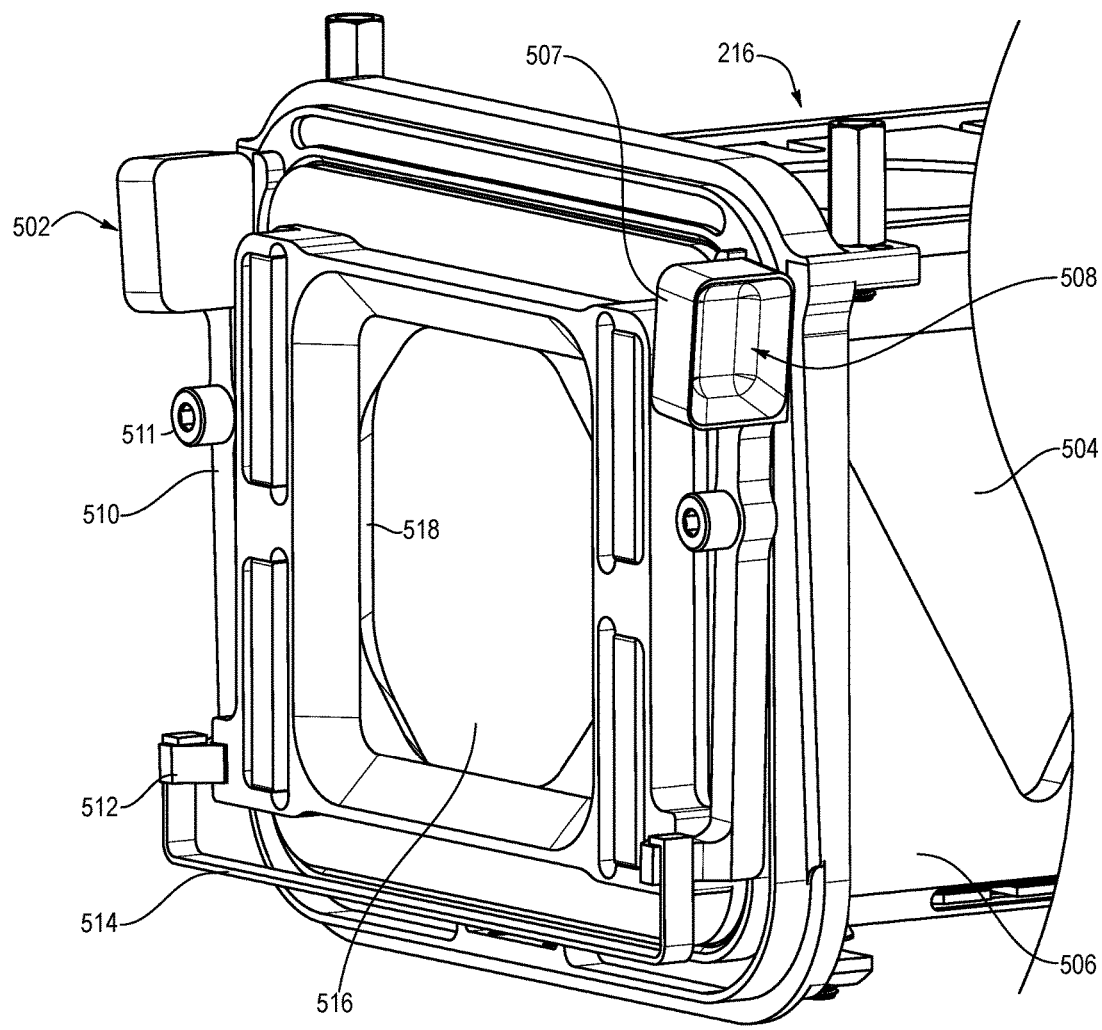
FIG. 5 illustrates a perspective view of a battery assembly within a receiving slot of an unmanned aerial vehicle in accordance with one or more embodiments.

As mentioned above, the battery arm 302 can unlock and remove a battery assembly 216 from within a main housing 204 of a UAV 202. In particular, as shown in FIG. 5, the battery arm 302 can unlock a battery assembly 216 from a UAV 202 by engaging a latch assembly 502 (or simply "latch 502") on the UAV 202. In particular, in one or more embodiments, the outer fingers 312 of the battery arm 302 can engage a portion of the latch 502 and unlock the battery assembly 216 from within the UAV 202.

As shown in FIG. 5, the battery assembly 216 includes a battery cell 504 within a battery housing 506 inserted and locked within a receiving slot of a UAV 202. In particular, FIG. 5 shows one example of the battery assembly 216 inserted and locked within the main housing 204 of the UAV 202 described above in connection with FIG. 2. Additionally, as shown in FIG. 5, the UAV 202 can include a latch 502 that secures the battery assembly 216 within the receiving slot of the UAV 202. As illustrated in FIG. 5, the latch 506 includes a latch handle 507 (or simply "handle 507"), opening 508 of the handle 507, latch arm 510, pivot 511, lock 512, and latch spring 514. In one or more embodiments, the latch 502 includes an assembly that is part of the main housing 204 of the UAV 202. Alternatively, the latch 502 can include a separate assembly that attaches to or otherwise couples to the main housing 204 of the UAV 202.

As mentioned above, the latch 502 can secure the battery assembly 216 within the UAV 202. In particular, as shown in FIG. 5, a portion of the latch 502 can overlap an opening of the receiving slot of the UAV 202 and prevent the battery assembly 216 from sliding out from the UAV 202. More specifically, in one or more embodiments, the locks 512 of the latch 507 overlap a portion of the opening of the receiving slot thus overlapping a portion of the battery housing 506. As such, where a non-impeded battery assembly 216 would slide out from the UAV 202, the locks 512 provide a structure that prevents the battery assembly 216 from sliding out from the UAV 202 unimpeded.

While the locks 512 provide a structure that prevents the battery assembly 216 from sliding out from the UAV 202 unimpeded, the locks 512 also enable the battery assembly 216 to conveniently slide into the UAV 202 (e.g., without engaging the handles 507). In particular, as shown in FIG. 5 the latch 502 includes a latch spring 514 that connects the locks 512 on either side of the opening to the receiving slot. As such, when outward pressure is applied to the locks 512, the latch spring 514 moves, expands, or otherwise enables the locks 512 to move outward and allow the battery assembly 216 to slide into the opening of the UAV 202.

In one or more embodiments, the locks 512 have a slanted or tapered shape that enables the battery assembly 216 to apply outward force to the locks 512 when the battery assembly 216 slides into the UAV 202. In particular, in one or more embodiments, the locks 512 slant inward such that when the battery assembly 216 makes contact with the locks 512 and moves toward the opening of the UAV 202, an outward force is applied to the locks 512 that causes the latch spring 514 and the locks 512 to move outward. Additionally, once the battery assembly 216 is inserted within the UAV 202, the locks 512 and latch spring 514 automatically return to an equilibrium position with the locks 512 overlapping a portion of the opening of the receiving slot and preventing the battery assembly 216 from sliding out from the UAV 202.

In addition to locking the battery assembly 216 within the UAV 202, the latch 502 can further enable the battery arm 302 to conveniently unlock the battery assembly 216 by engaging the latch handles 507. For example, as shown in FIG. 5, the handles 507 couple to the locks 512 via a latch arm 510 between each handle 507 and lock 512. Additionally, as shown in FIG. 5, the latch 502 includes a pivot 511 around which the latch arm 510 can rotate. As such, when an inward force is applied on each of the latch handles 507, the latch handles 507 move inward around the latch pivot 511 and cause the locks 512 to move outward around the latch pivot 511 until the locks 512 no longer obstruct the receiving slot of the UAV 202. When the locks 512 no longer obstruct the receiving slot of the UAV 202, the battery assembly 216 can slide out from the UAV 202 unobstructed.

In one or more embodiments, the battery arm 302 unlocks the battery assembly 216 by engaging the latch openings 508 of the latch handles 507. In particular, the battery arm 302 can engage the latch openings 508 and apply a force to each of the latch handles 507 that causes the battery assembly 216 to unlock from within the UAV 202. As an example, the outer fingers 312 of the battery arm 302 can fit within the latch openings 508 and push inward on the latch handles 507 causing each of the latch handles 507 to move towards each other (e.g., inward around a central axis of the battery assembly 216). More specifically, the outer fingers 312 can push inward on the latch handles 507 and cause the latch arms 510 to pivot around the latch pivots 511. As the latch handles 507 move inward around the latch pivots 511, the locks 512 move outward from each other (e.g., outward from the central axis of the battery assembly 216) and rotate around the latch pivots 511. As such, by applying the inward force on the latch handles 507, the locks 512 can move outward and remove the obstruction securing the battery assembly 216 in place within the UAV 202.

Once unlocked, the battery arm 302 can further remove the battery assembly 216 from within the UAV 202 by engaging a portion of the battery assembly 216. As shown in FIG. 5, the battery assembly 216 includes an outer end 516 facing outward form the UAV 202. Additionally, as shown in FIG. 5, the outer end 516 of the battery assembly 216 includes an inner lip around one or more edges of the outer end 516. In one or more embodiments, the battery arm 302 can remove the battery assembly 216 by engaging the outer end 516 and one or more inner lips 518 of the outer end 516 of the battery assembly 216.

For example, once the battery assembly 216 is unlocked, a portion of the battery gripping assembly of the battery arm 302 can move towards the outer end 516 and cause a portion of the battery arm 302 to come into contact with the outer end 516. In one or more embodiments, the inner fingers 322 of the battery arm 302 come into contact with the battery end 516. Additionally, upon making contact with or coming within a predetermined proximity to the outer end 516, the inner fingers 322 can engage the inner lip(s) 518 of the outer end 516 and attach, hook, or otherwise grip the battery assembly 216 by the inner lip 518. For example, as described above, when the inner fingers 322 are in position relative to the inner lip 518, the spreader 328 of the battery arm 302 can cause the inner fingers 322 to move outward and grip each of the inner lips 518 of the outer end 516 of the battery assembly 216.

Once the battery arm 302 has gripped the inner lips 518 of the battery assembly 216, the battery arm 302 can retract and cause the battery assembly 216 to slide out from the main housing 204 of the UAV 202. In particular, one or more of the motors 310 of the battery arm 302 can cause one or more portions of the battery arm 302 to retract. For example, in one or more embodiments, the motor 310b coupled to the battery gripping assembly can cause the battery gripping assembly to retract and remove the battery assembly 216 from the UAV 202. Additionally, while the motor 310b causes the battery gripping assembly to retract, the latch engagement assembly (e.g., the outer fingers 312) can remain engaged with the latch 502 and disengage after the battery assembly 216 has been removed from the UAV 202. It is appreciated that the battery assembly 302 can unlock and remove the battery assembly 216 from within the UAV 202 by gripping the battery assembly 216 from a single end. Thus, in one or more embodiments, the battery assembly 216 includes a latch 502 and inner lip 518 or other gripping point on only one end of the battery assembly 216.

Additionally, in one or more embodiments, the outer end 516 of the battery assembly 216 prevents water and other material from entering an opening of the UAV 202 by forming a seal around the opening of the UAV 202. For example, in one or more embodiments, the outer end 516 of the battery assembly 216 is larger than the battery housing 506 that inserts within the opening of the UAV 202. Thus, when the battery assembly 216 is inserted within the UAV 202, portions of the outer end 516 (such as a gasket or washer) can form a seal around the opening of the UAV 202.

Figure 6A:
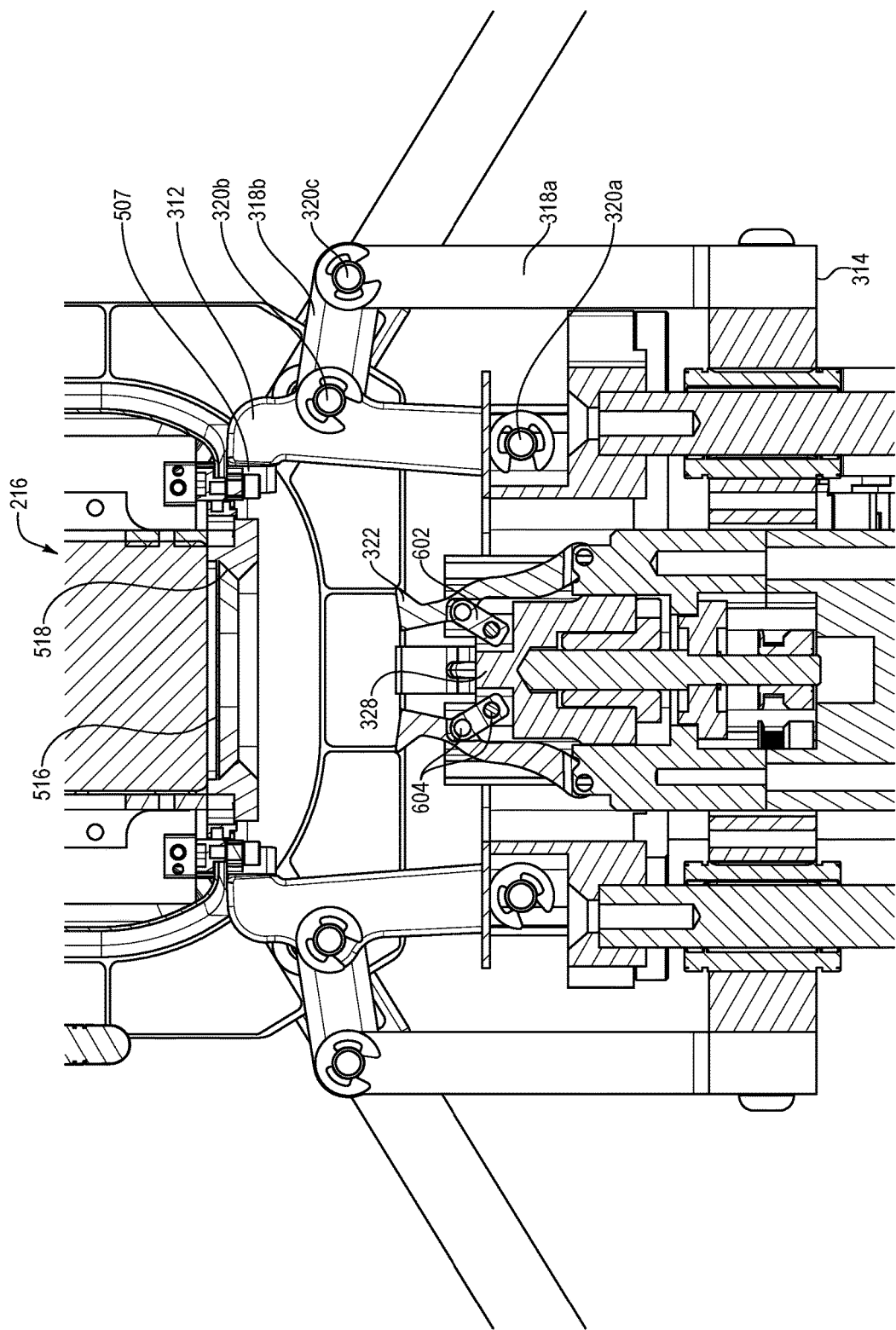
FIG. 6A illustrates a top cross-sectional view of an example battery arm engaging latches of an unmanned aerial vehicle to unlock a battery assembly within the unmanned aerial vehicle in accordance with one or more embodiments.

As mentioned above, the battery arm 302 can engage with the UAV 202 to unlock the battery assembly 216 from within the UAV 202. For example, FIG. 6A illustrates an example embodiment of a battery arm 302 unlocking a battery assembly 216 from within the UAV 202. In particular, FIG. 6A shows a top cross-sectional view of one example embodiment in which the latch engagement assembly engages a latch 502 of the UAV 202 to unlock the battery assembly 216 from within the UAV 202.

For example, as shown in FIG. 6A, the outer fingers 312 rotate about a plurality of pivot points 320a-c and engage a handle 507 of the latch 502. In particular, when the drive plate 314 moves towards the UAV 202, the outer fingers 312 rotate about the first pivot point 320a from an initial perpendicular position to the battery assembly 216 to a parallel position relative to the battery assembly 216, as shown in FIG. 6A. While the outer fingers 312 rotate about the first pivot point, a first link 318a between the plate 314 and the outer fingers 312 moves towards the battery assembly 216 causing a second link 318b between the first link 318 and the outer finger 312 to pivot about a second pivot point. Additionally, when the outer fingers 312 approach the handle 507 and fit within the opening 508 of the handle 507, the second link 318b can pivot about the third pivot point 320c as the outer fingers 312 fit within the opening 508 and engage the latch 502.

Additionally, as described above, the outer fingers 312 can unlock the battery assembly 216 from within the UAV 202 by applying inward force on the handles 507 and causing one or more locks 512 to bend, pivot, or otherwise move outward and disengage from a position that prevents the battery assembly 216 from sliding out from the UAV 202. Further, as shown in FIG. 6A, once the outer fingers 312 are engaged, the battery arm 302 includes a gap between the outer arms 312 that enables an additional portion of the battery arm 302 (e.g., the battery gripping assembly) to move towards the battery assembly 216 between each of the outer arms 312.

Figure 6B:
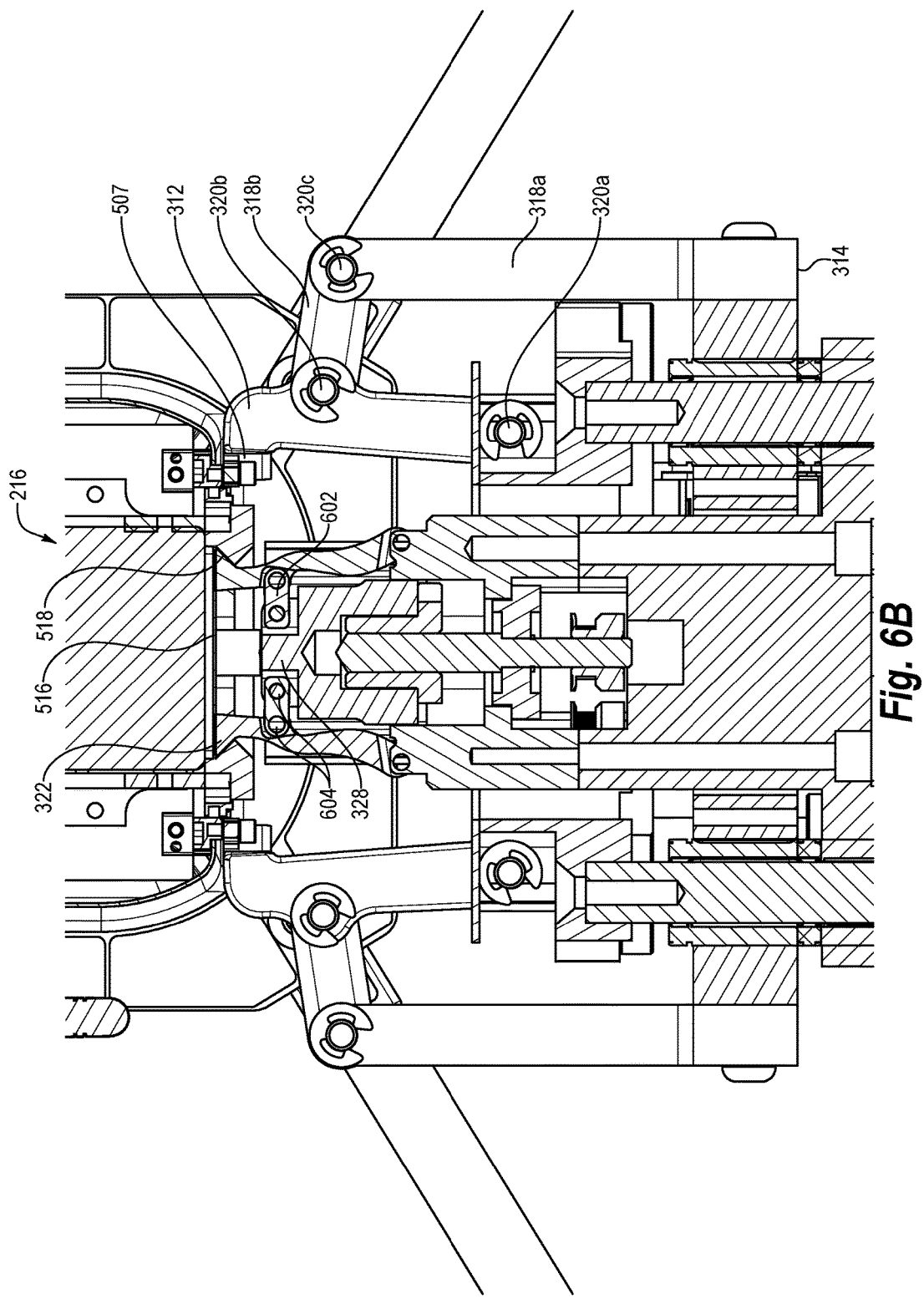
FIG. 6B illustrates a top cross-sectional view of an example battery arm engaging a battery assembly within an unmanned aerial vehicle in accordance with one or more embodiments.

As mentioned above, once the battery assembly 216 is unlocked, the battery arm 302 can further engage the battery assembly 216 by gripping a portion of an outer end 516 of the battery assembly 216. For example, as shown in FIG. 6B, the battery gripping assembly can engage the battery assembly 216 by moving towards the battery assembly 216 and coming into contact with the outer end 516. As mentioned above, in one or more embodiments, the battery arm 302 includes one or more sensors 330 that detect that a portion of the battery arm 302 (e.g., the inner fingers 322) have made contact with or are within a threshold proximity of the outer end 516 of the battery assembly 216. As such, the sensors 330 can prevent the battery arm 302 from inadvertently damaging or causing excessive wear and tear on the battery assembly 216 and/or UAV 202.

Once the inner fingers 322 come into contact with the outer end 516, the battery arm 302 can cause the inner fingers 322 to grip an inner lip 518 of the outer end 516 of the battery assembly 216. For example, as shown in FIG. 6B, the battery arm 302 includes a spreader 328 that moves towards the battery assembly 216 and causes the inner fingers 322 to move outward and grip the inner lips 518 of the outer end 516 of the battery assembly 216. In one or more embodiments, the spreader 328 couples to the inner fingers 322 via one or more links 602 that pivot around one or more pivot points 604 as the spreader 328 moves towards the battery assembly 216.

Additionally, in causing the inner fingers 322 to move outward and grip the inner lips 518 of the outer end 516 of the battery assembly 216, the inner fingers 322 can further cause the battery arm 302 to self-align with respect to the outer end 516 of the battery assembly 216. For example, as the inner fingers 322 each move outward around a central axis of the battery arm 302, the inner fingers 322 come into contact with and exert a force against the inner lips 518 of the outer end 516 of the battery assembly 216. As the inner fingers 322 each come into contact with the inner lips 518 and further extend outward around a central axis of the battery arm 302, the battery arm 302 self-aligns with respect to the battery assembly 216 within the UAV 202.

In one or more embodiments, the battery arm 302 can cause a portion of the outer end 516 to compress when the inner fingers 322 or other portion of the battery arm 302 comes into contact with and applies a force on the outer end 516 of the battery assembly 216. For example, after the inner fingers 322 come into contact with the outer end 516 of the battery assembly 216, the outer end 516 can compress into the opening of the receiving port of the UAV 202. When the outer end 516 compresses, the spreader 328 can cause the inner fingers 322 to move outward and grip the inner lips 518 that are made available via the compression of the outer end 516.

While the battery arm 302 grips the unlocked battery assembly 216, the battery arm 302 can retract and remove the battery assembly 216 from the UAV 202. For example, as shown in FIG. 6C, the battery gripping assembly can retract or otherwise move away from the UAV 202 and cause the battery assembly 216 to slide out from the UAV 202. In one or more embodiments, the latch engagement assembly continues to engage the UAV 202 while the battery gripping assembly removes the battery assembly 216 from within the UAV 202. For example, as shown in FIG. 6C, the outer fingers 322 remain engaged with the latch handles 507 to remove the obstruction of the locks 512 while the battery assembly 216 slides out from the UAV 202. The latch engagement assembly can disengage from the latch 502 once the battery assembly 216 is removed and the battery arm 302 can retract within the UAVGS 102.

Additionally, the battery arm 302 can further store the removed battery assembly 216 within the UAVGS 102 and place a new (e.g., charged) battery within the receiving slot of the UAV 202. For example, upon storing the removed battery assembly 216 within the UAVGS 102, the battery arm 302 can move within the UAVGS 102 and retrieve a new battery using a similar or different process as removing the battery assembly 216 from within the UAV 202. The battery arm 302 can further align with the receiving slot of the UAV 202 and insert the new battery within the UAV 202 to enable the UAV 202 to take off, fly, and land with a full battery.

As discussed above, the battery arm 302 can engage with a UAV 202 and/or battery assembly 216 to remove the battery assembly 216 from within the UAV 202. Additionally, as mentioned above, in one or more embodiments, the battery arm 302 includes one or more sensors 330 that detect a position of the battery arm 302 relative to the battery assembly 216. In particular, the sensors 330 can detect a plurality of sensor contacts positioned on the outer end 516 of the battery assembly 216 facing outward from the UAV 202. Additionally, as will be described in greater detail below, the sensor contacts can be arranged in various patterns and using various materials across the outer end 516 of the battery assembly 216 to facilitate detection and identification of a battery assembly 216 using the battery arm 302. For example, FIGS. 7A-7D illustrates different examples of a battery assembly 216 having different arrangements of sensor contacts on the outer end 516 of the battery assembly 216.

Figure 7A:
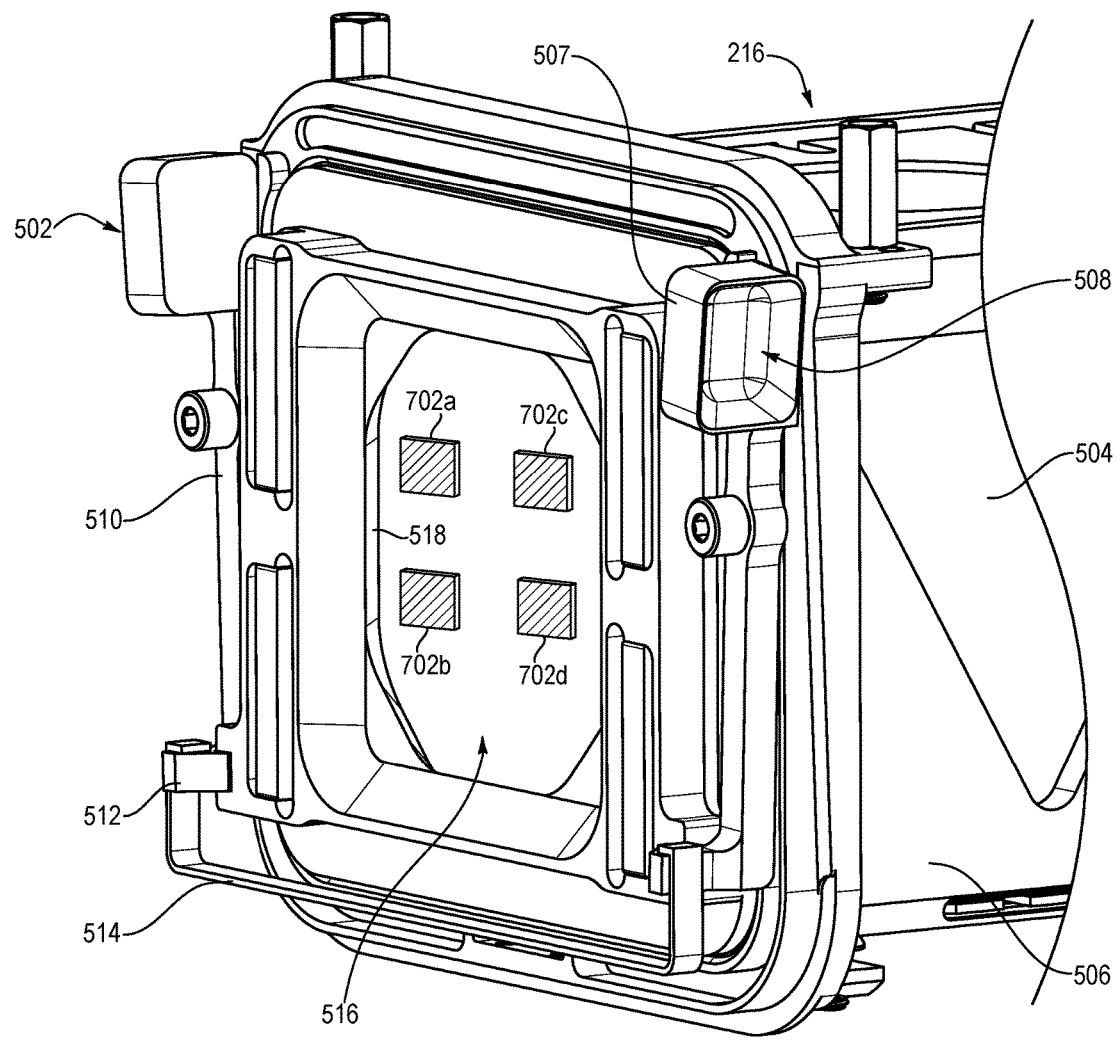
FIG. 7A illustrates an example arrangement of sensor contacts arranged on an outer end of a battery assembly in accordance with one or more embodiments.

For example, FIG. 7A illustrates a battery assembly 216 having an arrangement of sensor contacts 702*a-d* on an outer end 516 of the battery assembly 216 facing outward from the main body 204 of the UAV 202. In particular, as shown in FIG. 7A, the battery assembly 216 includes four sensor contacts 702*a-d* positioned on the outer end 516 and facing outward from the UAV 202. Alternatively, one or more embodiments of the battery assembly 216 include fewer or more sensor contacts from the sensor contacts 702*a-d* shown in FIG. 7A. It is appreciated that the battery assembly 216 can include any number of sensor contacts arranged on the outer end 516 of the battery assembly 216 in a variety of patterns.

In one or more embodiments, the battery assembly 216 includes a plurality of sensor contacts symmetrically arranged on the outer end 516 of the battery assembly 216. For example, as shown in FIG. 7A, the battery assembly 216 includes four sensor contacts 702*a-d* arranged symmetrically around a central axis of the battery assembly 216. Alternatively, in one or more embodiments, the battery assembly 216 includes a non-symmetrical arrangement of sensor contacts positioned about the outer end 516 of the battery assembly.

The arrangement of sensor contacts can be similar or different across different battery assemblies. For example, in one or more embodiments, the arrangement of sensor contacts is uniform across similar models of the battery assembly 216. Additionally, the arrangement of sensor contacts can be different across different models of battery assemblies having different dimensions or specifications. Further, in one or more embodiments, the pattern of sensor contacts is unique to a particular battery assembly 216 in order to associate a battery assembly 216 with a unique identifier. As such, the pattern of sensor contacts can be used to identify a particular model or type of battery assembly 216, a specific battery assembly 216 from other battery assemblies, or identify any battery assembly 216 generally.

As an alternative to having a unique pattern of sensor contacts that are particular to each individual or type of battery assembly 216, the battery assembly 216 can include an arrangement of sensor contacts on the outer end 516 of the battery assembly 216 that corresponds to an arrangement of sensors 330 on the battery arm 302. For example, as shown in FIG. 7A, the battery assembly 216 includes an arrangement of four sensor contacts 702a-d positioned about the outer end 516 of the battery assembly 216 in positions that correspond to a placement of the sensors 330 of the battery arm 302 when the battery gripping assembly approaches the outer end 516 of the battery assembly 216. In one or more embodiments, the battery assembly 216 includes one of the plurality of sensor contacts 702a-d for each sensor 330 on the battery arm 302. For example, as shown in FIG. 7A, the four contacts 702a-d may correspond to four sensors 330 that are each positioned symmetrically around a central axis passing through the battery arm 302 and/or battery assembly 216 when the battery arm 302 is aligned with the battery assembly 216.

Further, the sensor contacts can be made from a variety of materials. For example, as shown in FIG. 7A, the sensor contacts 702a-d can include a metal or other conductive material. In one or more embodiments, the sensor contacts 702a-d include metal contacts positioned on a non-conductive surface (e.g., the outer end 516) of the battery assembly 216. Alternatively, one or more embodiments of the sensor contacts can be made using a different conductive material other than metal. For example, the sensor contacts 702a-d can be made from a conductive graphite, polymer, or other material capable of conducting an electrical signal.

As mentioned above, the UAVGS 102 can use the sensors 330 to detect the sensor contacts 702a-d and identify a battery assembly 216 as the battery arm 302 approaches the battery assembly 216. For example, as described above, the battery arm 302 can align with respect to the battery assembly 216. Once aligned, the battery arm 302 can selectively extend toward the battery assembly 216. As a portion of the battery arm 302 approaches the battery assembly 216, the sensors 330 can detect the sensor contacts 702a-d on the outer end 516 of the battery assembly 216. In one or more embodiments, the sensors 330 detect a particular pattern of sensor contacts 702a-d corresponding to a known pattern of contacts associated with a battery assembly 216. Additionally, the UAVGS 102 can identify the battery assembly 216 based on the detected pattern and determine that the battery arm 302 is approaching a battery assembly 216 as opposed to a different object (e.g., an animal, rock) that has come into contact with the UAVGS 102 or UAV 202.

In the case that the battery arm 302 positively identifies that the battery arm 302 is approaching a battery assembly 216, the battery arm 302 can continue the process of engaging the battery assembly 216. For example, upon positive identification of the battery assembly 216, the battery arm 302 can engage the UAV 202 and battery assembly 216 to unlock, grip, and remove the battery assembly 216 from within the UAV 202. Alternatively, in the case that the battery arm 302 fails to positively identify that the battery arm 302 is approaching a battery assembly 216, the battery arm 302 can stop moving towards the particular object and/or disengage. In one or more embodiments, the UAVGS 102 can provide a signal to an operator or remote device and indicate that a foreign object is potentially interfering with operation of the UAVGS 102 and UAV 202.

As mentioned above, sensor contacts 702 can be made using a variety of materials and arranged using a variety of patterns. Additionally, a variety of sensors 330 exist for detecting a particular type of sensor contact and/or pattern of sensor contacts arranged on the outer end 516 of the battery assembly 216. For example, in one or more embodiments, the sensors 330 can include sensors capable of detecting and identifying a particular pattern of metal contacts. For instance, relating to the example arrangement of conductive contacts 702a-d in FIG. 7A, the sensors 330 can detect the pattern of conductive sensor contacts 702a-d as the sensors 330 get close enough to determine that the sensor contacts 702a-d include conductive material (e.g., metal) on a non-conductive surface of the battery assembly 216. Further, where the battery arm 302 includes an individual sensor 330 for each individual sensor contact 702a-d, the UAVGS 102 can identify that the object that the battery gripping assembly is approaching is the battery assembly 216 when each of the sensors 330 detect a corresponding conductive contact 702a-d that corresponds to a known pattern of contacts associated with the battery assembly 216.

In one or more embodiments, the sensors 330 include one or more Eddy-Current sensors that detect a pattern of sensor contacts based on an interaction between an alternating magnetic field and the plurality of sensor contacts. For example, in the example shown in FIG. 7A, as a portion of the battery arm 302 approaches the conductive sensor contacts 702a-d, the battery arm 302 can generate an alternating current in the sensors 330 that induces or otherwise creates a magnetic field between the sensors 330 and the sensor contacts 702a-d. Where the sensor contacts 702a-d include metal or other conductive material, the magnetic field can induce an electrical current in the sensor contacts 702a-d that in turn generates an opposing magnetic field to the magnetic field originating from the sensors 330. The sensors 330 can detect and measure the opposing magnetic field that opposes the magnetic field and identify or otherwise determine a distance between the sensors 330 and the sensor contacts 702a-d. Additionally, the sensors 330 can detect and measure the opposing magnetic field to identify or otherwise determine a particular pattern of sensor contacts 702a-d on the outer end 516 of the battery assembly 216. Additionally, while one or more embodiments described herein include Eddy-Current sensors, the sensors 330 can further include other sensor types, such as capacitive sensors, infrared sensors, radio-frequency (RF) sensors, or other sensors capable of detecting one or more conductive sensor contacts 702a-d on the outer send 516 of the battery assembly 216 with or without coming into physical contact with the sensor contacts 702a-d.

In one or more embodiments, utilizing sensors 330 capable of detecting a pattern of metal and/or non-metal sensor contacts can enable the UAVGS 102 to determine a distance between the battery arm 302 and the battery assembly 216 as well as identifying a particular pattern of sensor contacts in a variety of environments. For example, where optical sensors may experience difficulty identifying a pattern of sensor contacts through a buildup of dust or debris, Eddy-Current sensors and other metal-detecting sensors can detect conductive sensor contacts through build up of dust and other objects that could otherwise obstruct visual detection and identification of the pattern of sensor contacts. Additionally, where a proximity sensor may similarly experience difficulty in distinguishing between the outer end 516 of the battery assembly 216 and a surface of a foreign object within the UAVGS 102, Eddy-Current sensors and other metal-detecting sensors can reliably distinguish a surface of the outer end 516 of the battery assembly 216 including the pattern of sensor contacts from other objects without the corresponding pattern of sensor contacts. As such, the metal-detecting sensors (e.g., Eddy-Current sensors) on the battery arm 302 enable the battery arm 302 to reliably detect and identify a pattern of sensor contacts in a variety of environments and conditions.

Figure 7B:
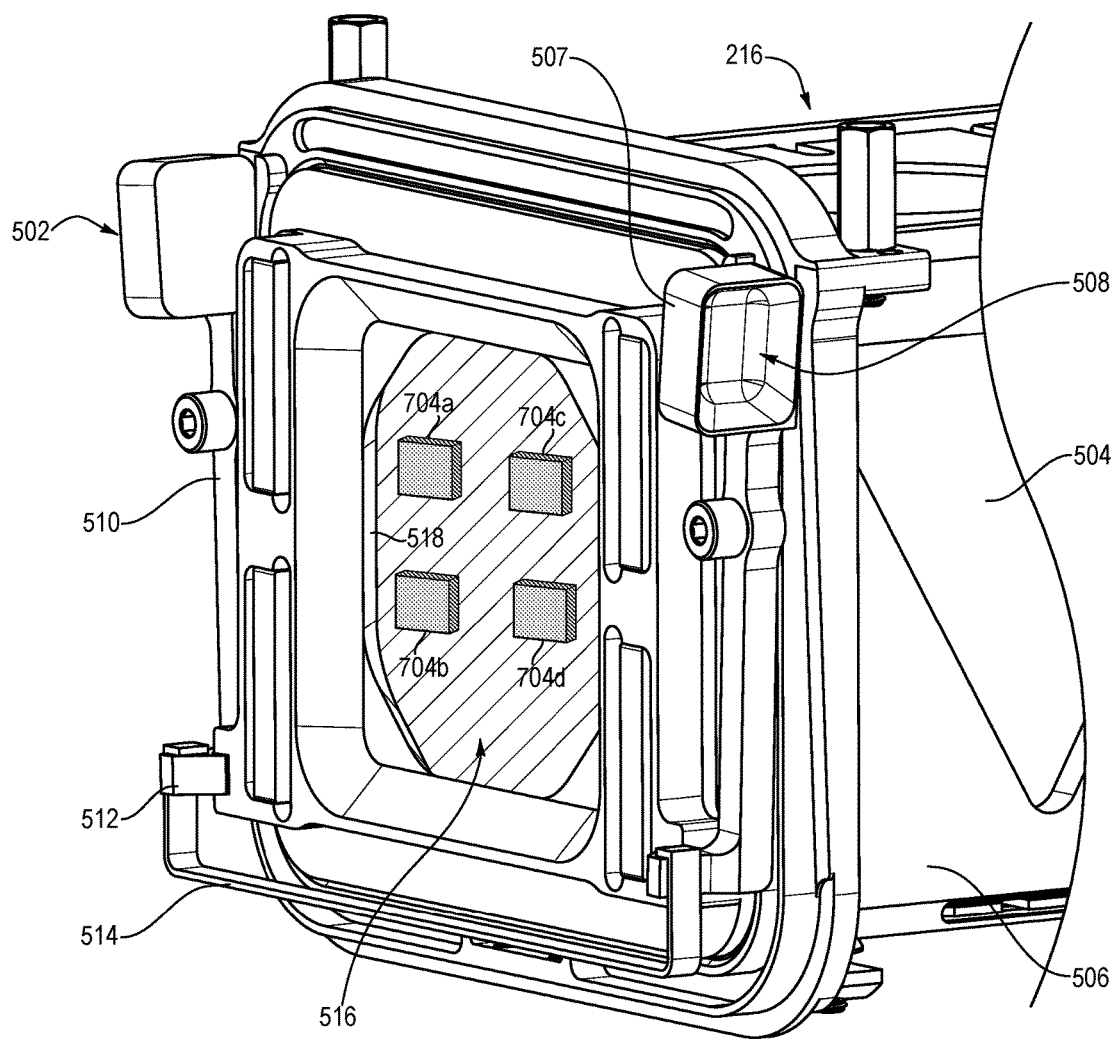
FIG. 7B illustrates another example arrangement of sensor contacts arranged on an outer end of a battery assembly in accordance with one or more embodiments.

As mentioned above, the battery assembly 216 can include various arrangements of sensor contacts made from different types of materials. For example, as shown in FIG. 7B, as an alternative to metal or electrically conductive sensor contacts, the battery assembly 216 can include non-conductive sensor contacts arranged in a pattern on the outer end 516 of the battery assembly 216. The non-conductive sensor contacts 704a-d can include any non-conductive material such as, for example, rubber, plastic, or other non-conductive material that the sensors 330 can detect as the battery arm 302 approaches the battery assembly 216. In one or more embodiments, the non-metal sensor contacts 704a-d include a compressible material that flexes, bends, retracts, or otherwise compresses when a portion of the battery arm 302 approaches and physically touches the non-metal sensor contacts 704a-d. As another example, the non-metal sensor contacts 704a-d can include compressible rubber, string gauges, or other sensor contacts that facilitate sensor detection through physical contact.

In one or more embodiments, the non-metal sensor contacts 704a-d can protrude outward from the outer end 516 of the battery assembly 216. For example, as shown in FIG. 7B, the non-metal sensor contacts 706a-d protrude outward from the metal surface of the outer end 516 such that when the battery gripping assembly approaches the battery assembly 216, the battery gripping assembly initially makes contact with one or more of the non-conductive sensor contacts 704a-d prior to making contact with a conductive surface of the outer end 516 of the battery assembly 216. As such, the non-conductive sensor contacts 704a-d can prevent the battery gripping assembly or other portion of the battery arm 302 from more forcefully making contact with the battery assembly 216 and potentially causing damage to the battery arm 302 and/or battery assembly 216.

Additionally, similar to the electrically conductive sensor contacts 702a-d described above in connection with FIG. 7A, the non-conductive sensor contacts 704a-d can enable the UAVGS 102 to determine a distance between the battery arm 302 and battery assembly 216 as well as identify a particular pattern of the non-conductive sensor contacts 704a-d on the outer end 516 of the battery assembly 216. For example, in one or more embodiments, the sensors 330 detect the non-conductive sensor contacts 704a-d when the sensors 330 come into physical contact with the non-conductive sensor contacts 704a-d as a portion of the battery arm 302 approaches the battery assembly 216. Additionally, when the sensors 330 come into contact with the non-conductive sensor contacts 704a-d, the UAVGS 102 can identify the pattern of the non-conductive sensor contacts 704a-d and identify whether the pattern corresponds to a known arrangement of sensor contacts associated with the battery assembly 216.

As an alternative to detecting the non-conductive sensor contacts 704a-d based on physical contact between the sensors 330 and the non-conductive sensor contacts 704a-d, the UAVGS 102 can detect a position of the battery arm 302 relative to the battery assembly 216 as well as identify the pattern of non-conductive sensor contacts 704a-d without facilitating physical contact between the battery arm 302 and the battery assembly 216. For example, similar to the process described above in connection with FIG. 7A, where a surface of the outer end 516 of the battery assembly 216 includes a metal or other electrically conductive material, the sensors 330 can detect a position of the non-conductive sensor contacts 704a-d and a pattern of the non-conductive sensor contacts 704a-d on the outer end 516 of the battery assembly 216 by applying a magnetic field to the non-conductive sensor contacts 704a-d. In particular, where the sensors 330 are Eddy-Current sensors, the sensors 330 or other circuitry on the battery arm 302 can apply a magnetic field to the outer end 516 of the battery assembly 216 and induce a current on the metal portion of the outer end 516 of the battery assembly 216 which induces an opposing magnetic field to the alternating magnetic applied to the non-conductive sensor contacts 704a-d. The sensors 330 can determine a pattern of non-conductive areas (e.g., the non-conductive sensor contacts 704a-d) to identify the pattern of the non-conductive sensor contacts 704a-d and determine whether the pattern of the non-conductive sensor contacts 704a-d corresponds to a known pattern of sensor contacts associated with the battery assembly 216.

Figure 7C:
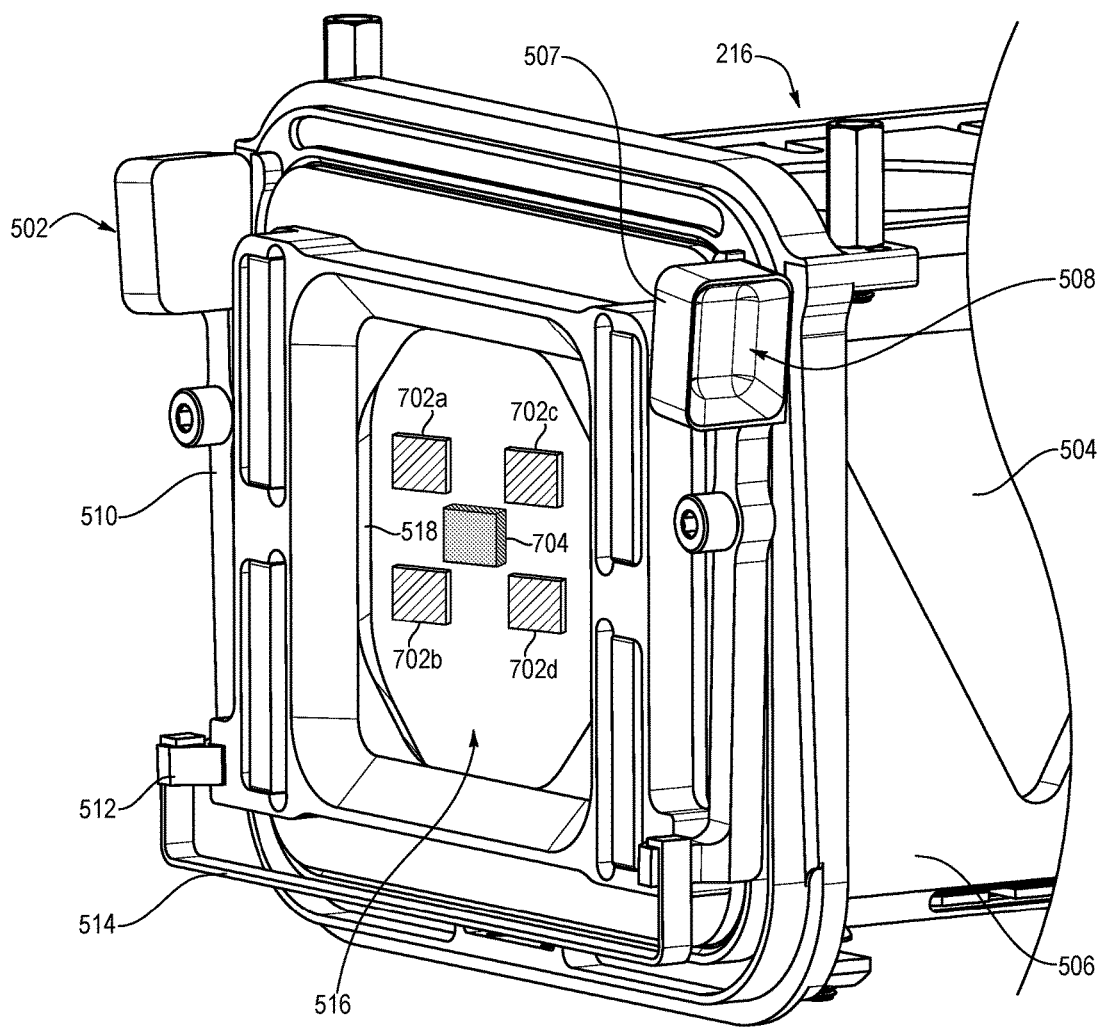
FIG. 7C illustrates another example arrangement of sensor contacts arranged on an outer end of a battery assembly in accordance with one or more embodiments.

In one or more embodiments, the battery assembly 216 includes a combination of conductive and non-conductive contacts arranged in a pattern on the outer end 516 of the battery assembly 216. For example, as shown in FIG. 7C, the battery assembly 216 includes a combination of conductive sensor contacts 702a-d and at least one non-conductive sensor contact 704. Additionally, as shown in FIG. 7C, the battery assembly 216 includes four conductive sensor contacts 702a-d arranged symmetrically around a central axis of the battery assembly 216 and a non-conductive sensor contact 704 positioned between the conductive sensor contacts 702a-d that protrudes outward from a surface of the outer end 516 of the battery assembly 216. It is appreciated that the battery assembly 216 can include any number of the different types of sensor contacts 702a-d, 704 arranged in various patterns on the outer end 516 of the battery assembly 216.

Similar to the example arrangements of sensor contacts described above in connection with FIGS. 7A-7B, the combined arrangements of conductive sensor contacts 702a-d and non-conductive sensor contact 704 can detect a proximity of the battery arm 302 with respect to the battery assembly 216 as well as identify a particular pattern of the sensor contacts 702a-d, 704 on the outer end 516 of the battery assembly 216. Additionally, in one or more embodiments, the UAVGS 102 can utilize the different types of sensor contacts to individually detect the position of the battery arm 302 with respect to the battery assembly 216 as well as identify the pattern of sensor contacts 702a-d, 704.

As an example, in one or more embodiments, the UAVGS 102 can detect that the battery arm 302 is in a position to engage the UAV 202 and/or battery assembly 216 based on physical contact between the battery gripping assembly and the non-conductive sensor contact 704 as the battery gripping assembly approaches the outer end 516 of the battery assembly 216. Alternatively or in addition to detecting proximity based on physical contact, the conductive sensor contacts 702a-d can also detect proximity between the battery arm 302 and battery assembly 216 by detecting the conductive sensor contacts 702a-d without the battery arm 302 coming into physical contact with the battery assembly 216. For example, where the sensors 330 include one or more Eddy-Current sensors, the sensors 330 can apply a magnetic field to the outer end 516 of the battery assembly 216 to induce a competing magnetic field from the conductive sensor contacts 702a-d and determine a proximity between the sensors 330 and the battery assembly 216 based on a strength of the induced magnetic field. Moreover, the UAVGS 102 can include other types of detection (e.g., optical, radiofrequency (RF)) capable of detecting a proximity of the battery arm 302 to the battery assembly 216.

Additionally, the sensors 330 can identify the battery assembly by detecting the pattern of sensor contacts 702a-d, 704 on the outer surface 516 of the battery assembly 216. In one or more embodiments, the sensors 330 can identify a pattern of both conductive sensor contacts 702a-d and non-conductive sensor contacts 704 by applying a magnetic field to the outer end 516 of the battery assembly 216 and detecting an opposing magnetic field induced by any conductive material (e.g., the conductive sensor contacts 702a-d and/or other portion of the outer end 516) to determine a pattern of the sensor contacts 702a-d, 704. Alternatively, in one or more embodiments, the sensors 330 can identify a pattern of the conductive sensor contacts 702a-d while ignoring the non-conductive sensor contacts 704. For example, where the non-conductive sensor contact 704 is used to facilitate detection of the battery arm 302 coming into physical contact with the battery assembly 216, the UAVGS 102 may only consider the conductive sensor contacts 702a-d in detecting and identifying a particular pattern of the conductive sensor contacts 702a-d.

Figure 7D:
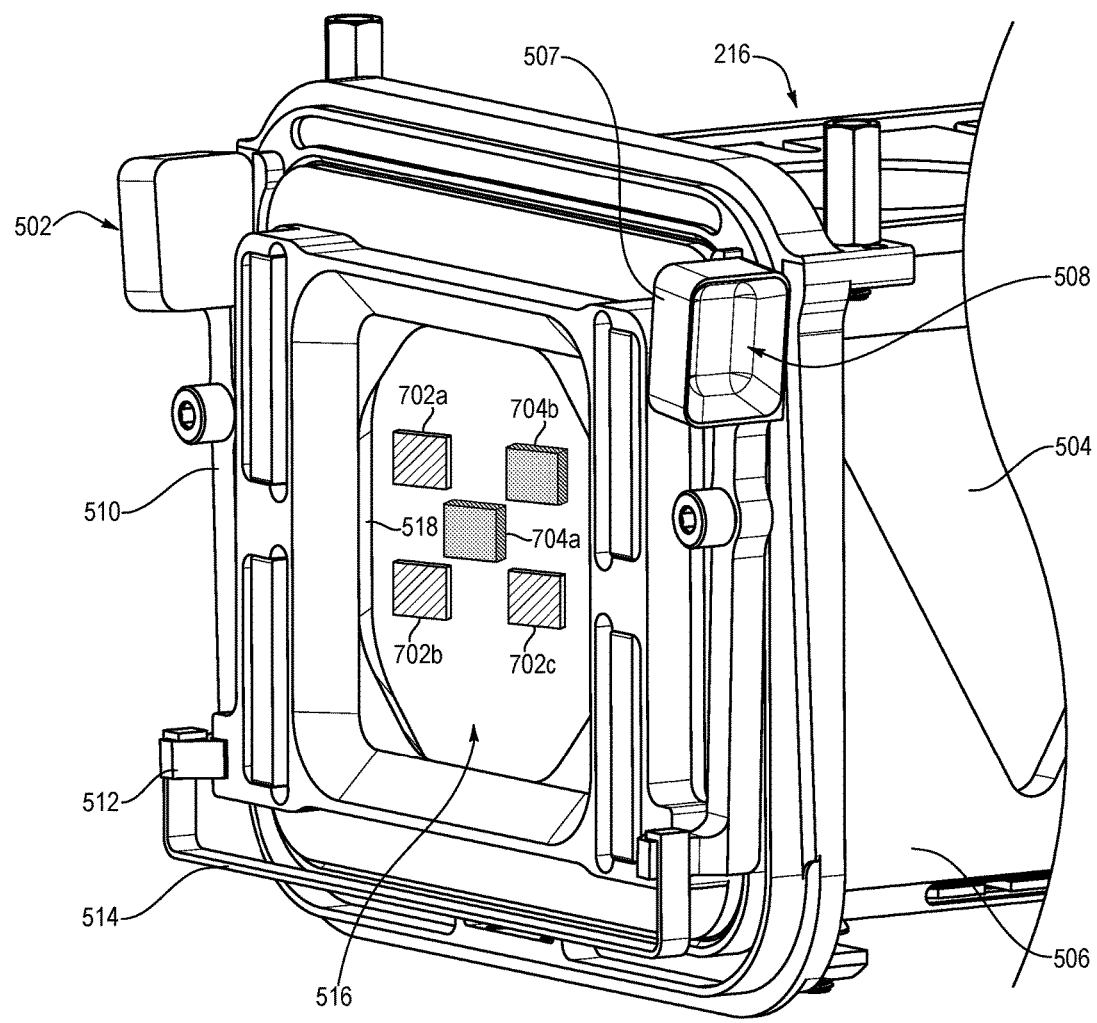
FIG. 7D illustrates yet another example arrangement of sensor contacts arranged on an outer end of a battery assembly in accordance with one or more embodiments.

As mentioned above, the battery assembly 216 can include any number of arrangements of sensor contacts that enable the UAVGS 102 to detect a proximity between the battery arm 302 and the battery assembly 216 as well as identifying the battery assembly 216 based on a pattern of sensor contacts on the outer end 516 of the battery assembly 216. For example, FIG. 7D illustrates another example arrangement of conductive sensor contacts 702a-c and non-conductive sensor contacts 704a-b. The particular arrangement of conductive sensor contacts 702a-c and non-conductive sensor contacts 704a-b may provide an indication that the battery assembly 216 is a particular model or type of battery assembly 216. Alternatively, the arrangement of sensor contacts 702a-c and non-conductive sensor contacts 704a-b can provide an indication that the battery assembly 216 corresponds to a particular user or UAV 202.

Figure 8:
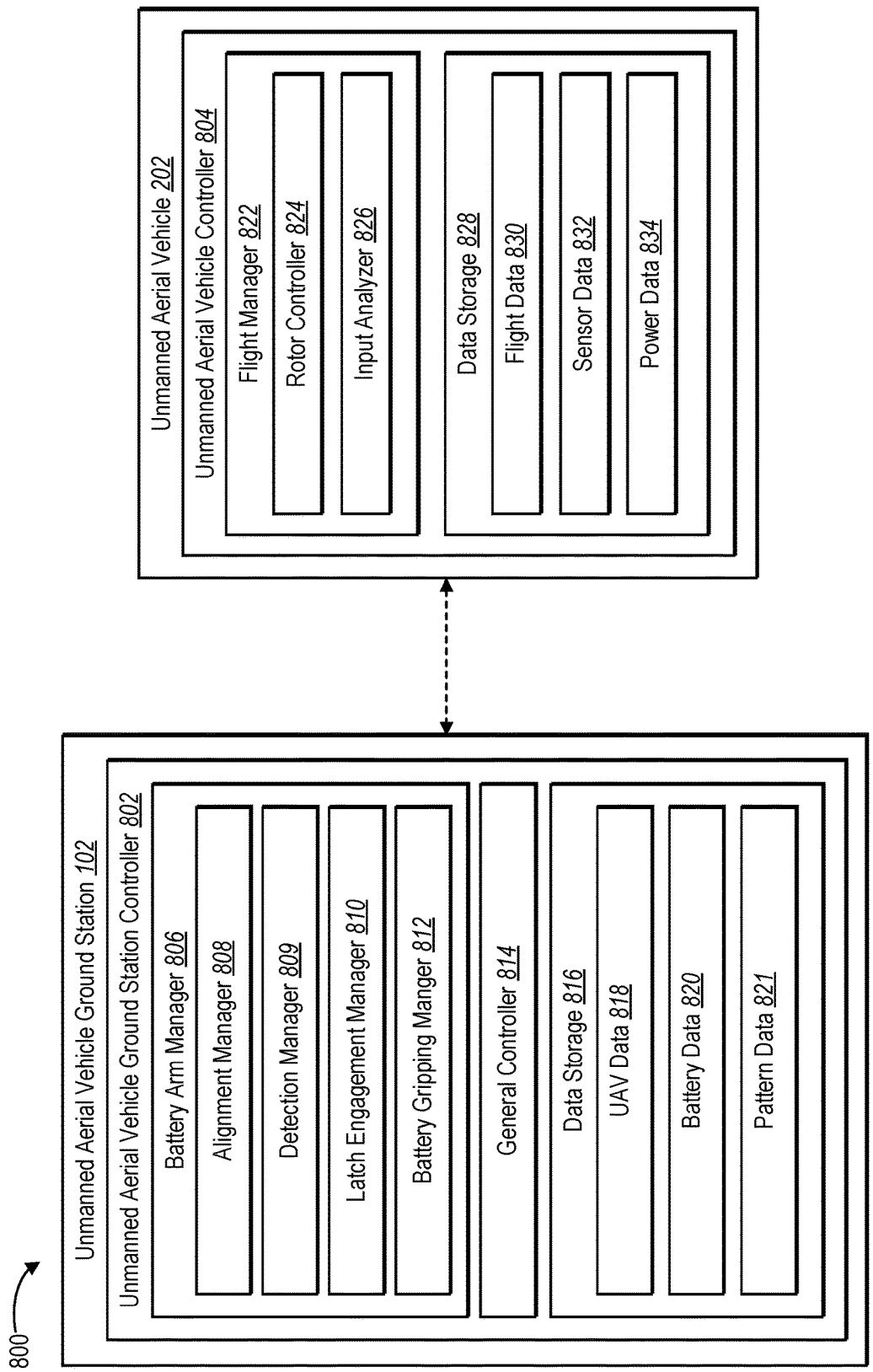
FIG. 8 illustrates a schematic diagram of an autonomous landing system in accordance with one or more embodiments.

FIG. 8 illustrates a schematic diagram showing an example embodiment of an autonomous landing system 800 (or simply "system 800") within which various embodiments of a battery arm be implemented. As shown in FIG. 8, the system 800 may include various components for performing the processes and features described herein. For example, as shown in FIG. 8, the system 800 includes, but is not limited to, an unmanned aerial vehicle ground station 102 (or simply "UAVGS 102") and an unmanned aerial vehicle 202 (or simply "UAV 202"). As shown in FIG. 8, the UAVGS 102 can include a UAVGS controller 802, which in turn can include, but is not limited to, a battery arm manager 806 including an alignment manager 808, a detection manager 809, a latch engagement manager 810, and a battery gripping manager 812. Additionally, the UAVGS controller 802 can include a general controller 814 and data storage 816 including UAV data 818, battery data 820, and pattern data 821. Further, as shown in FIG. 8, the UAV controller 804 can include, but it not limited to, a flight manager 822 including a rotor controller 824 and an input analyzer 826. Additionally, the UAV controller 804 can include a data storage 828 including flight data 830, sensor data 832, and power data 834.

Each of the components 806-821 of the UAVGS controller 802, and the components 822-834 of the UAV controller 804 can be implemented using a computing device including at least one processor executing instructions that cause the system 800 to perform the processes described herein. In some embodiments, the components 806-821 and 822-834 can comprise hardware, such as a special-purpose processing device to perform a certain function. Additionally or alternatively, the components 806-821 and 822-834 can comprise a combination of computer-executable instructions and hardware. For instance, in one or more embodiments the UAV 202 and/or the UAVGS 102 include one or more computing devices, such as the computing device described below with reference to FIG. 10. In one or more embodiments, the UAVGS controller 802 and the UAV controller 804 can be native applications installed on the UAVGS 102 and the UAV 202, respectively. In some embodiments, the UAVGS controller 802 and the UAV controller 804 can be remotely accessible over a wireless network.

Additionally, while FIG. 8 illustrates a UAVGS controller 802 having components 806-821 located thereon, it is appreciated that the UAV controller 804 can include similar components having features and functionality described herein with regard to the UAVGS controller 802. Similarly, while FIG. 8 illustrates a UAV controller 804 having components 822-834 located thereon, it is appreciated that the UAVGS controller 802 can include similar components having features and functionality described herein with regard to the UAV controller 804. As such, one or more features described herein with regard to the UAVGS controller 802 or the UAV controller 804 can similarly apply to both the UAVGS controller 802 and/or the UAV controller 804.

As described above, the system 800 includes components across both the UAVGS 102 and the UAV 202 that enable the UAV 202 to autonomously land on the UAVGS 102 and for the UAVGS 102 to remove a battery from within the UAV 202. Accordingly, the system 800 includes various components that enable a battery arm 302 on board the UAVGS 102 to remove a battery assembly 216 from within the UAV 202 while the UAV 202 is landed without any external intervention (e.g., without an operator remotely controlling the UAVGS 102 and/or UAV 202 during the battery removal process). Additionally, in one or more embodiments, the UAVGS 102 can cause a battery arm 302 to perform a multi-stage engagement process with respect to removing the battery assembly 216 and/or storing the battery assembly 216 on board the UAVGS 102 autonomously without assistance from a remote operator and without causing substantial wear and tear on the UAV 202. Further, as described above, the UAVGS 102 can further include one or more components that enable the battery arm 302 to remove a battery assembly 216 from within the UAV 202 without causing damage to the UAV 202 and/or UAVGS 102.

As mentioned above and as illustrated in FIG. 8, the UAVGS controller 802 includes a battery arm manager 806 that controls various functions of a battery arm 302 on board the UAVGS 102. As shown in FIG. 8, the battery arm manager 806 includes an alignment manager 808 that controls a position of the battery arm 302 with respect to a landed UAV 202. For example, the alignment manager 808 can cause the battery arm 302 to rotate, shift, or otherwise move within a housing 104 of the UAVGS 102 such that an end of the battery arm 302 aligns with respect to the battery assembly 216 within the UAV 202.

For example, the alignment manager 808 can cause a battery arm 302 to align with respect to the UAV 202 that is landed within the UAVGS 102. For example, the alignment manager 808 can cause the battery arm 302 to move along a linear or rotational axis of movement and align with respect to an end of a battery assembly 216 inserted within the UAV 202. Additionally, once the battery assembly 216 is removed, the alignment manager 808 can cause the battery arm 302 to move within the UAVGS 102 (e.g., along the axis of movement) and align with respect to one or more battery banks within the UAVGS 102 that are sized to receive and store the battery assembly 216.

In addition to the alignment manager 808, the battery arm manager 806 includes a detection manage 809 that prevents portions of the battery arm 302 from inadvertently coming into contact with the UAV 202 and/or UAVGS 102 and/or from colliding with one or more foreign objects within the UAVGS 102 or UAV 202. For example, as described above, one or more embodiments of the battery arm 302 includes a plurality of sensors 330 on an end of the battery arm 302 that enables the detection manager 809 to detect a position of the battery arm 302 with respect to the battery assembly 216.

In particular, the detection manager 809 can detect a proximity or position of the battery arm 302 with respect to the battery assembly 216. For example, after the alignment manager 808 causes the battery arm 302 to align with respect to the UAV 202, and as a portion of the battery arm 302 selectively extends towards the UAV 202 to engage the battery assembly 216, the detection manager 809 can utilize the sensors 330 on the battery arm 302 and detect a position of the battery arm 302 with respect to the battery assembly 216. In one or more embodiments, the detection manager 809 detects that the battery arm 302 is at a predetermined position with respect to the outer end 516 of the battery assembly 216 and communicates the position to the latch engagement manager 710 and/or battery gripping manager 712 to facilitate engaging the UAV 202 and/or battery assembly 216 via the latch engagement assembly and/or battery gripping assembly.

In one or more embodiments, the detection manager 809 detects the position of the battery arm 302 with respect to the battery assembly 216 based on a detection of one or more sensor contacts 702, 704 on the outer end 516 of the battery assembly 216. For example, as a portion of the battery arm 302 (e.g., the battery gripping assembly) approaches the battery assembly 216, the detection manager 809 can detect the pattern of sensor contacts 702, 704 on the outer end 516 of the battery assembly via proximity sensors, metal sensors, Eddy-Current sensors, or other type of sensor(s) capable of detecting one or more sensor contacts 702, 704 on the outer end 516 of the battery assembly 216. In this way, the detection manager 809 can prevent one or more portions of the battery arm 302 from inadvertently coming into contact with the battery assembly 216 and/or other portion of the UAV 202 or UAVGS 102 rather than engaging the UAV 202 and battery assembly 216 to unlock and/or remove the battery assembly 216 from within the UAV 202.

In addition to detecting a general position of the battery arm 302 with respect to the battery assembly 216, the detection manager 809 can further identify the battery assembly 216 by detecting a pattern of the sensor contacts 702, 704 on the outer end 516 of the battery assembly 216. In particular, the detection manager 809 can detect a particular pattern of sensor contacts 702, 704 that corresponds to a known pattern of contacts associated with the battery assembly 216. In this way, the detection manager 809 can determine that the battery arm 302 is approaching a battery assembly 216 as opposed to a different object (e.g., an animal, rock) that has come into contact with the UAVGS 102 or UAV 202.

In addition to the detection manager 809, the battery arm manager 806 includes a latch engagement manager 810 that controls engagement of the UAV 202 using a portion of the battery arm 302. For example, once the battery arm 302 is aligned with respect to the UAV 202 and the detection manager 809 has indicated that the battery arm 302 is approaching the battery assembly 216, the latch engagement manager 810 can cause a latch engagement assembly of the battery arm 302 to move towards the UAV 202 and engage one or more latches of the UAV 202. Additionally, engaging the UAV 202 can cause the battery assembly 216 within the UAV 202 to unlock such that the battery assembly 216 can slide out from a receiving slot of the UAV 202.

In one or more embodiments, the latch engagement manager 810 causes the battery assembly 216 to unlock by applying a force on one or more latch handles 507 and removing one or more obstructions (e.g., latch locks 512) that prevent the battery assembly 216 to slide out from the UAV 202. For example, the latch engagement manager 810 can cause outer fingers 312 to rotate around one or more pivot points, engage the latch handles 507, and unlock the battery assembly 216 from within the UAV 202.

As shown in FIG. 8, the battery arm manager 806 further includes a battery gripping manager 812 that causes the battery arm 302 to grip a portion of the battery assembly 216 and/or UAV 202 and remove the unlocked battery assembly 216 from the UAV 202. For example, in one or more embodiments, the battery gripping manager 812 causes the battery gripping assembly to engage the outer end 516 of the battery assembly 216 after the detection manager 809 has positively identified the battery assembly 216 (e.g., based on a detected pattern of sensor contacts 702, 704). In causing the battery gripping assembly to engage the battery assembly 216, the battery gripping manager 814 can control movement of one or more inner fingers 322 that grip an outer end 516 of the battery assembly 216. Additionally, the battery gripping manager 814 can cause a portion of the battery arm 302 to retract and remove the battery assembly 216 from within the UAV 202.

Moreover, while not shown in FIG. 8, the battery arm manager 806 can further control movement of the battery arm 302 to store a removed battery assembly 216 and/or replace the removed battery assembly 216 with a new (e.g., charged) battery. For example, the battery arm manager 806 can cause the battery arm 302 to rotate and/or move within the UAVGS 102 and place the removed battery assembly 216 within a charging slot within the UAVGS 102. Additionally, in one or more embodiments, the battery arm manager 806 can cause the battery arm 302 to grip a new battery and place the new battery within the UAV 202.

In addition to the battery arm manager 806, the UAVGS controller 802 further includes a general controller 814. In one or more embodiments, the general controller 814 can handle general system tasks including, for example, battery charging, data storage, UAV docking, receiving and processing user input, etc. As an example, after the UAV 202 autonomously lands on the UAVGS 102, the general controller 814 can manage receiving and processing user input with regard to recharging a battery while the UAV 202 is landed. As another example, in one or more embodiments, the general controller 814 can manage downloading or transferring data collected by the UAV 202 (e.g., during a previous flight). Additionally, in one or more embodiments, the general controller 814 can control transmission, receiving, and processing various signals received from the UAV 202.

Furthermore, as mentioned above, and as illustrated in FIG. 8, the UAVGS controller 802 also includes a data storage 816. As shown, the data storage 816 can include UAV data 818, battery data 820, and pattern data 821. In particular, the UAV data can include data representative of information associated with the UAV 202. Additionally, battery data 820 can include information associated with batteries within the UAV 202 and/or within the UAVGS 102.

For example, the battery data 820 can include information about battery life, charge capacity, voltage and current specifications and other information associated with batteries within the UAV 202 and/or UAVGS 102. Moreover, the data storage 716 can include information associated with various patterns of sensor contacts 702, 704 on one or more battery assemblies. For example, the pattern data 821 can include a list, table, database, or other storage of one or more contact patterns known to correspond to a pattern of sensor contacts 702, 704 on one or more battery assemblies.

As shown in FIG. 8, the UAV controller 804 includes a flight manager 822. In one or more embodiments, and in order for the UAV 202 to autonomously land on the UAVGS 102, the flight manager 822 can control all of the mechanical flight elements associated with the UAV 202 (e.g., motors, rotor arms, rotors, landing gear, etc.). For example, in at least one embodiment, the flight manager 822 can receive input from one or more sensors on the UAV 202 and/or UAVGS 102. The flight manager 822 can then control various mechanical features of the UAV 202 based on the received inputs in order to autonomously land the UAV 202 on the UAVGS 102.

As illustrated in FIG. 8, the flight manager 822 includes a rotor controller 824. In one or more embodiments, the rotor controller 824 controls the speed of one or more rotors associated with the UAV 202. Accordingly, by controlling the speed of the rotors, the rotor controller 824 can cause the UAV 202 to travel up and down vertically. Additionally, in at least one embodiment, the rotor controller 824 controls the pitch of one or more rotors associated with the UAV 202. Accordingly, by controlling the pitch of one or more rotors associated with the UAV 202, the rotor controller 824 can cause the UAV 202 to travel back and forth, and side to side horizontally. Thus it follows that, by controlling the speed and pitch of one or more rotors associated with the UAV 202, the rotor controller 824 can cause the UAV 202 to travel anywhere within an uninhibited three-dimensional space.

Also as illustrated in FIG. 8, the flight manager 822 includes an input analyzer 826. In one or more embodiments, the input analyzer 826 analyzes the data or inputs received in order to determine a position of the UAV 202. For example, in one embodiment, the input analyzer 826 can analyze digital photographs or video provided by a camera on the UAV 202 to determine whether the UAV 202 is located in a position above the UAVGS 102. In another example, the input analyzer 826 can analyze energy sensor readings of an energy wave to determine how far above the UAVGS 102 the UAV 202 is located (e.g., the altitude of the UAV 202). The input analyzer 826 can utilize algorithms, lookup tables, etc. in order to determine the UAV's 202 position based on inputs received from the UAVGS 102 and/or other components within the UAV 202. Additionally, in at least embodiment, the input analyzer 826 can receive inputs from a global position system associated with the UAV 202 in order to determine the UAV's 202 position.

Furthermore, as mentioned above, and as illustrated in FIG. 8, the UAV controller 804 also includes a data storage 828. As shown, the data storage 828 can include flight data 830 and sensor data 832. In one or more embodiments, the flight data 830 can include data representative of the UAV's 202 flight, such as described herein (e.g., GPS information, camera information, etc.). Similarly, in one or more embodiments, the sensor data 832 can include data representative of information gathered by one or more sensors located on the UAV 202 and/or UAVGS 102. Additionally, in one or more embodiments, the data storage 828 can include power data 834. The power data 834 can include data representative of power information associated with a battery and/or one or more power systems on board the UAV 202. For example, the power data 834 can include a battery level, a remaining life of a battery, or a time for the battery on board the UAV 202 to recharge when docked within the UAVGS 102.

FIGS. 1-8, the corresponding text, and the above-discussed examples provide a number of different methods, systems, and devices for removing a battery assembly 216 from within a UAV 202. In addition to the foregoing, embodiments can also be described in terms of flowcharts comprising acts and steps in a method for accomplishing a particular result. For example, the method of FIG. 9 may be performed with less or more steps/acts or the steps/acts may be performed in differing orders. Additionally, the steps/acts described herein may be repeated or performed in parallel with one another or in parallel with different instances of the same or similar steps/acts.

Figure 9:
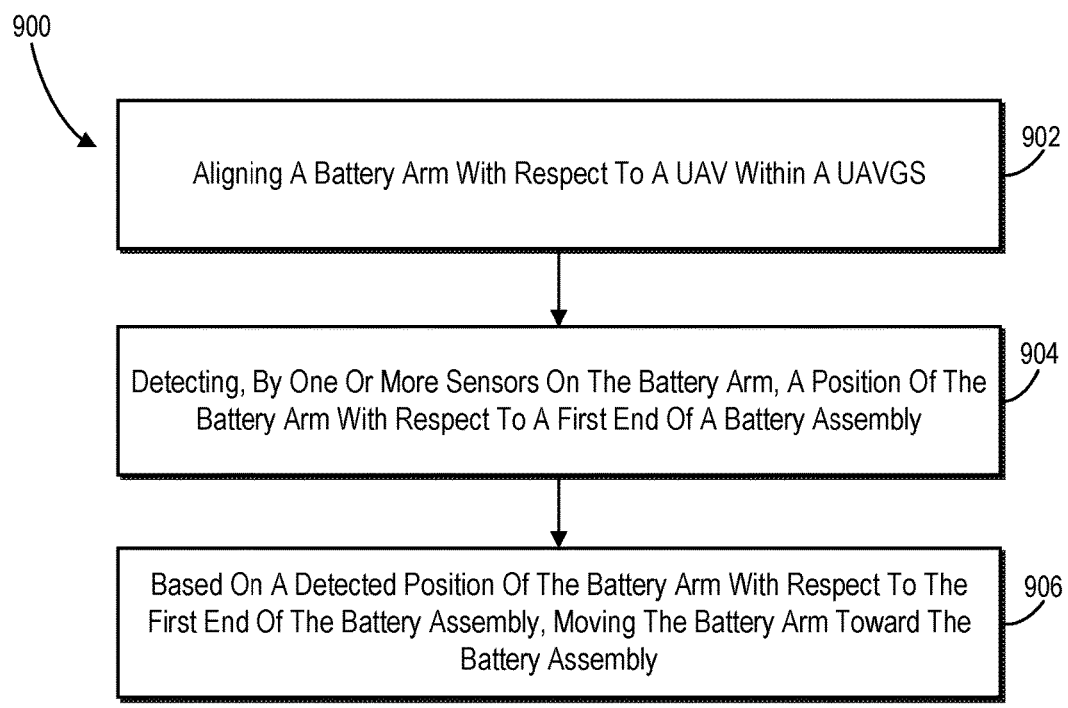
FIG. 9 illustrates a flowchart of a series of acts in a method of autonomously removing a battery assembly from within an unmanned aerial vehicle.

FIG. 9 illustrates a flowchart of one example method 900 for removing a battery assembly 216 from within an unmanned aerial vehicle (UAV) 202. In one or more embodiments, each step of the method 900 is performed by a battery arm 302 within a UAVGS 102. Additionally or alternatively, the UAV 202 can perform one or more steps of the method 900. In one or more embodiments, the UAVGS 102 and/or UAV 202 performs one or more steps in accordance with computer-executable instructions and hardware installed on the UAVGS 102 and/or UAV 202.

As shown in FIG. 9, the method 900 includes a process for removing a battery assembly 216 from within the UAV 202. For example, as shown in FIG. 9, the method 900 includes an act 902 of aligning a battery arm 302 within a UAVGS 102 with respect to a UAV 202 by moving the battery arm 302 within the UAVGS 102 with respect to the UAV 202. Additionally, in one or more embodiments, the battery arm 302 includes one or more sensors 330 on a portion (e.g., battery gripping assembly) of the battery arm 302 that extends toward the UAV 202. For example, aligning the battery arm 302 can involve moving the battery arm 302 along a linear or rotational axis of movement within the UAVGS 102 and align with respect to the UAV 202 such that a first end 304 of the battery arm 302 having the sensors 330 faces the UAV 202.

Additionally, as shown in FIG. 9, the method 900 includes an act 904 of detecting, by the one or more sensors 330 on the battery arm 302, a position of the battery arm 302 with respect to a first end of a battery assembly 216 within the UAV 202. Further, the first end of the battery assembly can include a plurality of sensor contacts 702, 704 arranged in a pattern on the first end of the battery assembly 216. In one or more embodiments, detecting the position of the battery arm 302 with respect to the battery assembly 216 involves detecting a position of the sensor contacts 702, 704 on the outer end 516 of the battery assembly 216.

Further, as shown in FIG. 9, the method 900 includes an act 906 of moving, based on the detected position of the battery arm with respect to the first end of the battery assembly 216, the portion of the battery arm 302 towards the first end of the battery assembly 216. For example, moving the portion of the battery arm 302 towards the first end of the battery assembly 216 can involve causing the battery gripping assembly to move towards the outer end 516 of the battery assembly 216 while the latch engagement assembly has engaged one or more latches 502 securing the battery assembly 216 within the UAV 202.

Alternatively, moving the battery arm 302 towards the first end of the battery assembly 216 can involve causing the battery gripping assembly or other portion of the battery arm 302 to move towards the battery assembly 216 prior to causing the latch engagement assembly to unlock the battery assembly 216 from within the UAV 202.

Additionally, while not shown in FIG. 9, the method 900 can further include an act of detecting the pattern of sensor contacts 702, 704 on the first end of the battery assembly 216. For example, in one or more embodiments, detecting the pattern of sensor contacts 702, 704 can involve applying, using one or more Eddy-Current sensors, a magnetic field to the outer end 516 of the battery assembly 216 as the battery arm 302 moves towards the first end of the battery assembly 216. Applying the magnetic field to the outer end 516 can induce an electrical current in one or more electrically conductive sensor contacts 702, in turn causing an opposing magnetic field to the magnetic field applied to the outer end 516 of the battery assembly 216. Detecting the pattern of sensor contacts 702, 704 can further involve detecting a pattern of the opposing magnetic field caused as a response to the magnetic field inducing a pattern of electrical currents within the plurality of sensor contacts 702, 704 on the first end of the battery assembly 216. In particular, the sensors 330 (e.g., Eddy-Current sensors) can detect a particular pattern of the opposing magnetic field caused as a result of induced electrical currents running through the electrical contacts 702 on the outer end 516 of the battery assembly 216.

Further, while not shown in FIG. 9, the method 900 can further include identifying that the pattern of sensor contacts 702, 704 on the first end of the battery assembly 216 corresponds to a known pattern of sensor contacts 702, 704 for the battery assembly 216. For example, the battery arm 302 can detect a particular pattern and compare the detected pattern to one or more known patterns to positively identify the battery assembly 216 within the UAV 202. In response to identifying that the pattern of sensor contacts 702, 704 on the first end of the battery assembly 216 corresponds to a known pattern of sensor contacts 702, 704 for the battery assembly 216, the method 900 can further include causing the portion of the battery arm 302 (e.g., the battery gripping assembly) to come into contact with or otherwise engage the first end of the battery assembly 216. For example, upon positively identifying the battery assembly 216, the battery gripping assembly can grip a portion of the battery assembly 216 and retract while gripping the battery assembly 216 to remove the battery assembly 216 from within the UAV 202.

Moreover, in one or more embodiments, the method 900 includes detecting an obstruction between the portion of the battery arm 302 and the first end of the battery assembly 216. For example, the sensors 330 can detect that a rock, animal, or other foreign object is positioned between the battery arm 302 and the battery assembly 216. In response to detecting the obstruction between the portion of the battery arm 302 and the first end of the battery assembly 216, the method 900 can include causing the portion of the battery arm 302 to stop moving towards the first end of the battery assembly 216. Similarly, the method 900 can further include causing the portion of the battery arm 302 to stop moving towards the first end of the battery assembly 216 in the event that the sensors 330 otherwise fail to positively identify the pattern of sensor contacts 702, 704 on the first end of the battery assembly 216.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) could be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, watches, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 10:
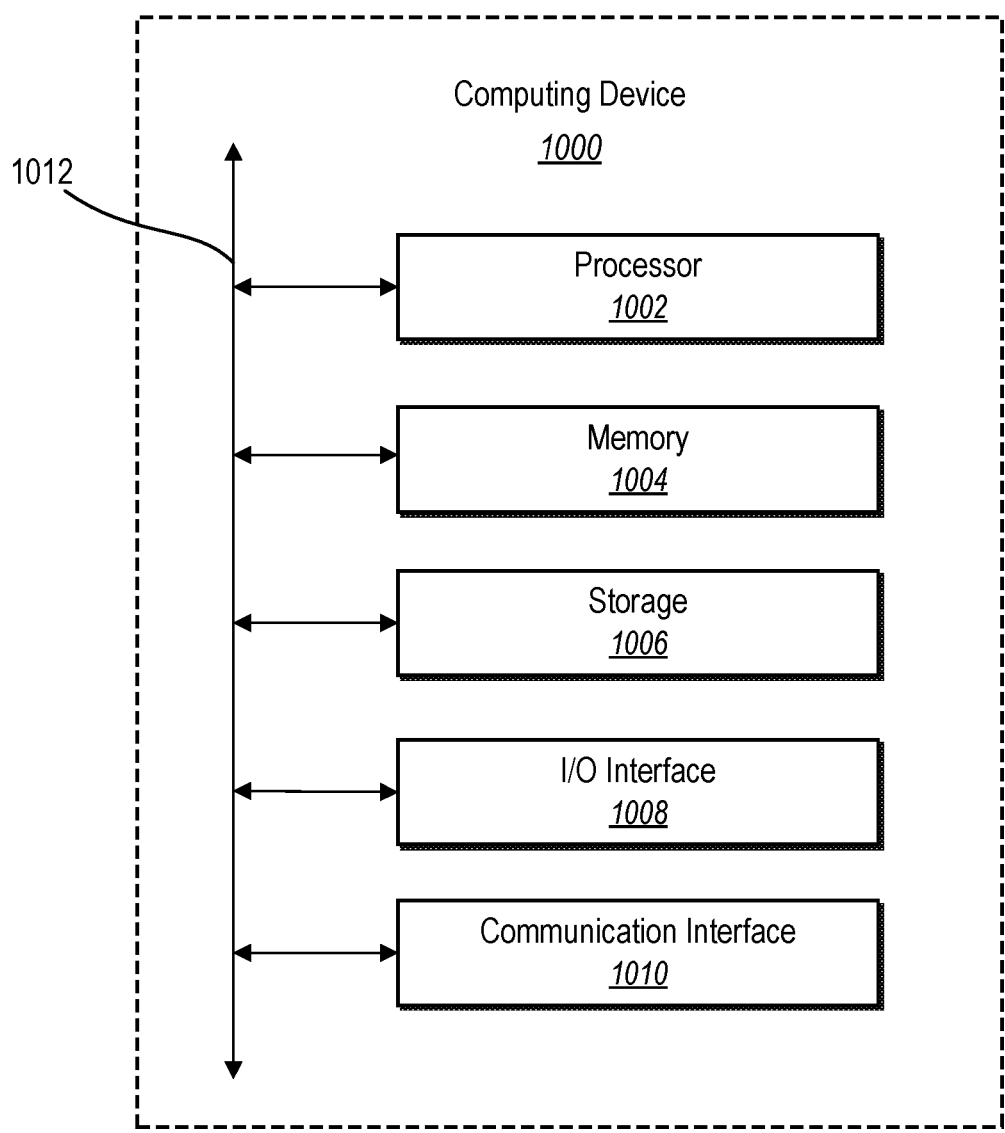
FIG. 10 illustrates a block diagram of an exemplary computing device in accordance with one or more embodiments.

FIG. 10 illustrates a block diagram of exemplary computing device 1000 that may be configured to perform one or more of the processes described above (e.g., as described in connection with the UAV 202 or UAVGS 102). As an example, the exemplary computing device 1000 can be configured to perform a process for removing a battery assembly 216 within a UAV 202. Further, the exemplary computing device 1000 can be configured to engage and remove a battery assembly 216 from within a UAV 202. Additionally, the computing device 1000 can be configured to perform one or more steps of the method 900 described above in connection with FIG. 9. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, the computing device 1000 can include fewer components than those shown in FIG. 10. Components of the computing device 1000 shown in FIG. 10 will now be described in additional detail.

In one or more embodiments, the processor 1002 includes hardware for executing instructions, such as those making up a computer program. As an example and not by way of limitation, to execute instructions, the processor 1002 may retrieve (or fetch) the instructions from an internal register, an internal cache, the memory 1004, or the storage device 1006 and decode and execute them. In one or more embodiments, the processor 1002 may include one or more internal caches for data, instructions, or addresses. As an example and not by way of limitation, the processor 1002 may include one or more instruction caches, one or more data caches, and one or more translation lookaside buffers (TLBs). Instructions in the instruction caches may be copies of instructions in the memory 1004 or the storage 1006.

The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The storage device 1006 includes storage for storing data or instructions. As an example and not by way of limitation, storage device 1006 can comprise a non-transitory storage medium described above. The storage device 1006 may include a hard disk drive ("HDD"), a floppy disk drive, flash memory, an optical disc, a magneto-optical disc, magnetic tape, or a Universal Serial Bus ("USB") drive or a combination of two or more of these. The storage device 1006 may include removable or non-removable (or fixed) media, where appropriate. The storage device 1006 may be internal or external to the computing device 1000. In one or more embodiments, the storage device 1006 is non-volatile, solid-state memory. In other embodiments, the storage device 1006 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller ("NIC") or network adapter for communicating with an Ethernet or other wire-based network or a wireless NIC ("WNIC") or wireless adapter for communicating with a wireless network, such as a WI-FI.

Additionally or alternatively, the communication interface 1010 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 1010 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1012 may include hardware, software, or both that couples components of the computing device 1000 to each other. As an example and not by way of limitation, the communication infrastructure 1012 may include a graphics bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Peripheral Component Interconnect ("PCI") bus, a PCI-Express ("PCIe") bus, a serial advanced technology attachment ("SATA") bus, a Universal Serial Bus ("USB") or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A system comprising:
    an unmanned aerial vehicle (UAV) comprising:
        a main body; and
        a battery assembly within the main body of the UAV, the battery assembly comprising a plurality of sensor contacts arranged in a first pattern on a first end of the battery assembly; and
    an unmanned aerial vehicle ground station (UAVGS) comprising:
        a landing housing sized to receive the UAV; and
        a battery arm comprising:
            a battery gripping assembly that extends through a portion of the landing housing to approach the first end of the battery assembly; and
            a plurality of sensors arranged in a second pattern on the battery arm corresponding to an arrangement of sensor contacts on one or more models of battery assemblies associated with the UAV, wherein the battery arm detects a position of the battery assembly based on each of the plurality of sensors detecting a corresponding sensor contact as the battery gripping assembly approaches the first end of the battery assembly.

2. The system as recited in claim 1, wherein the plurality of sensor contacts comprises one or more conductive contacts.

3. The system as recited in claim 2, wherein the plurality of sensor contacts comprises one or more non-conductive contacts.

4. The system as recited in claim 3, wherein the first pattern of sensor contacts comprises one or more conductive contacts and the one or more non-conductive contacts arranged on the first end of the battery assembly.

5. The system as recited in claim 1, wherein the first pattern of sensor contacts are arranged symmetrically on the first end of the battery assembly.

6. The system as recited in claim 1, wherein the plurality of sensor contacts comprise a plurality of metal contacts on a non-metal surface of the first end of the battery assembly.

7. The system as recited in claim 1, wherein the plurality of sensor contacts comprise a plurality of non-metal contacts on a metal surface of the first end of the battery assembly.

8. The system as recited in claim 1, wherein the battery arm further comprises a latch engagement assembly that unlocks the battery assembly from within the UAV by engaging at least one latch securing the battery assembly within the UAV.

9. The system as recited in claim 1, wherein the battery arm comprises an alignment assembly, the alignment assembly comprising an actuator that causes the battery arm to move within the UAVGS and align with respect to the battery assembly within the main body of the UAV.

10. The system of claim 1, wherein the battery assembly comprises at least one non-conductive contact that extends outward from the first end of the battery assembly to provide a first point of contact with the battery arm as the battery gripping assembly approaches the first end of the battery assembly.

11. The system of claim 10, wherein the at least one non-conductive contact comprises a compressible material that compresses as the battery gripping assembly approaches the first end of the battery assembly and comes into contact with the at least one non-conductive contact.

12. A battery arm, comprising:
    a battery gripping assembly operable to extend into an unmanned aerial vehicle ground station (UAVGS) to engage a battery assembly within an unmanned aerial vehicle (UAV), the battery assembly comprising a plurality of sensor contacts arranged in a first pattern on a first end of the battery assembly, wherein the first pattern of the plurality of sensor contacts corresponds to an arrangement of contacts on one or more models of battery assemblies associated with the UAV; and a plurality of sensors positioned on the battery arm and arranged in a second pattern corresponding to the first pattern of the plurality of sensor contacts on the first end of the battery assembly, wherein the plurality of sensors detect a position of the battery assembly based on each of the plurality of sensors detecting a corresponding sensor contact as the battery gripping assembly approaches the first end of the battery assembly.

13. The battery arm as recited in claim 12, wherein the plurality of sensors comprise one or more non-contact sensors that detect the position of the plurality of sensor contacts without coming into physical contact with the plurality of sensor contacts.

14. The battery arm as recited in claim 12, wherein the plurality of sensors comprise one or more contact sensors that detect the position of the plurality of sensor contacts by detecting an energy field between the plurality of sensors and the plurality of sensor contacts as the battery gripping assembly approaches the first end of the battery assembly.

15. The battery arm as recited in claim 12, wherein the plurality of sensors comprise one or more non-contact Eddy Current sensors.

16. The battery arm as recited in claim 15, wherein the one or more non-contact Eddy Current sensors detect a position of the plurality of sensor contacts on the battery assembly by:
   applying a magnetic field to the plurality of sensor contacts; and
   detecting one or more current patterns corresponding to the first pattern of the plurality of sensor contacts induced by the magnetic field.

17. The battery arm as recited in claim 16, wherein the one or more non-contact Eddy Currents further detect a distance between the battery arm and the plurality of sensor contacts as the battery gripping assembly approaches the first end of the battery assembly.

18. A method comprising:
   aligning a battery arm within an unmanned aerial vehicle ground station (UAVGS) with respect to an unmanned aerial vehicle (UAV) landed within the UAVGS by moving the battery arm within the UAVGS toward the UAV, the battery arm comprising a plurality of sensors arranged in a first pattern on a portion of the battery arm that extends toward the UAV, the first pattern of the plurality of sensors corresponding to an arrangement of contacts on one or more models of battery assemblies associated with the UAV;

detecting, by each of the plurality of sensors, a corresponding sensor contact from a plurality of sensor contacts arranged in a second pattern on a first end of a battery assembly corresponding to the first pattern of the plurality of sensors;

determining, based on each of the plurality of sensors detecting a corresponding sensor contact, that the second pattern of sensor contacts on the first end of the battery assembly corresponds to the arrangement of contacts on one or more models of battery assemblies associated with the UAV; and causing, in response to determining that the second pattern of sensor contacts on the first end of the battery assembly corresponds to the arrangement of contacts on the one or more models of battery assemblies associated with the UAV, the portion of the battery arm to move towards the first end of the battery assembly.

19. The method as recited in claim 18, wherein determining that the second pattern of sensor contacts on the first end of the battery assembly corresponds to the arrangement of contacts on one or more models of battery assemblies associated with the UAV comprises:
   applying a magnetic field to the first end of the battery assembly as the battery arm moves towards the first end of the battery assembly; and
   detecting an opposing magnetic field pattern caused as a response to the magnetic field inducing electrical currents within the plurality of sensor contacts on the first end of the battery assembly.

20. The method as recited in claim 18, further comprising:
   detecting an obstruction between the portion of the battery arm and the first end of the battery assembly; and
   in response to detecting the obstruction between the portion of the battery arm and the first end of the battery assembly, causing the portion of the battery arm to stop moving towards the first end of the battery assembly.

* * * * *